(12) United States Patent
de Campos

(10) Patent No.: US 6,272,456 B1
(45) Date of Patent: *Aug. 7, 2001

(54) SYSTEM AND METHOD FOR IDENTIFYING THE LANGUAGE OF WRITTEN TEXT HAVING A PLURALITY OF DIFFERENT LENGTH N-GRAM PROFILES

(75) Inventor: Miguel Cardoso de Campos, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,752

(22) Filed: Mar. 19, 1998

(51) Int. Cl.[7] .............................. G06F 17/27; G06F 17/20

(52) U.S. Cl. ...................................... 704/8; 704/9

(58) Field of Search ................................. 704/1, 8, 9, 10; 707/530, 531, 532, 533, 535, 536

(56) References Cited

U.S. PATENT DOCUMENTS

| | | | |
|---|---|---|---|
| 3,988,715 | * 10/1976 | Mullan et al. | 382/228 |
| 4,829,580 | * 5/1989 | Church | 704/260 |
| 5,062,143 | * 10/1991 | Schmitt | 382/230 |
| 5,182,708 | * 1/1993 | Ejiri | 704/1 |
| 5,293,584 | * 3/1994 | Brown et al. | 704/277 |
| 5,371,807 | * 12/1994 | Register et al. | 382/159 |
| 5,392,419 | * 2/1995 | Walton | 358/1.13 |
| 5,548,507 | * 8/1996 | Martino et al. | 704/1 |
| 5,608,624 | * 3/1997 | Luciw | 707/532 |
| 5,805,771 | * 9/1998 | Muthusamy et al. | 704/232 |
| 5,913,185 | * 6/1999 | Martino et al. | 704/8 |
| 6,064,959 | * 5/2000 | Young et al. | 704/251 |

OTHER PUBLICATIONS

Ted Dunning: "Statistical Identification of Language", Computing Research Laboratory, New Mexico State University, pp. 1–29, Mar. 1994.*

Ingle, Norman C., "A Language Identification Table," published in *The Incorporated Linguist*, vol. 15, No. 4, Autumn 1976, pp. 98–101.

Dunning, Ted, "Statistical Identification of Language," Computing Research Laboratory, New Mexico State University, Mar. 10, 1994, pp. 1–29.

(List continued on next page.)

*Primary Examiner*—Joseph Thomas
(74) *Attorney, Agent, or Firm*—Kilpatrick Stockton LLP

(57) ABSTRACT

A window of letters is identified within a text sample input. If the window contains matches to reference letter sequences (RLS) contained in multiple sets of n-gram language profiles (profiles), then the longest match is kept and scored for each language. Scoring each language is based on frequency parameters of the matched RLS in profiles for each language. The window is incrementally shifted through the sample and the matching and scoring is done on the letters within the window. At the end of the sample input, the language having the highest cumulative score is identified as the sample's language. Scoring may be improved by restricting the RLS within longer profiles to be full words, using two passes where the second pass disregards languages that are not scored near the highest scoring language during the first pass, favoring matched RLS within profiles of complete words during scoring, favoring longer matched RLS within profiles during scoring, and increasing a score of a match that does not frequently appear in many languages. The profiles may be enhanced by removing some of the RLS if the frequency of the RLS does not meet a predefined threshold and a variable threshold.

24 Claims, 10 Drawing Sheets

OTHER PUBLICATIONS

Cavnar et al., "N–Gram Based Text Characterization," Environmental Research Institute of Michigan, paper published in 1994, pp. 1–14.

"Comparing Two Language Identification Techniques," dated Nov. 14, 1996; document is located online at http://www.fr/publis/mltt/jadt/node1.html—node5.html, pp. 1–9.

"Stochastic Language Identifier," article found at http://www.cs.cmu.edu/~dougb/ident.html, p. 1.

Ziegler, "The automatic identification of language using linguistic recognition signals," dissertation presented at the State University of New York at Buffalo, 1991, Copyright © 1991 by Ziegler, Douglas–Val, pp. 1–122, A1–B6.

* cited by examiner

This is a test 905

SYSTEM AND METHOD FOR IDENTIFYING THE LANGUAGE OF WRITTEN TEXT HAVING A PLURALITY OF DIFFERENT LENGTH N-GRAM PROFILES

TECHNICAL FIELD

This invention generally relates to identifying the language of written text and, more particularly described, relates to identifying a language of a document from a small sample input of the document by using n-gram profiles.

BACKGROUND OF THE INVENTION

As large data networks span the globe to make the online world truly a multinational community, there is still no single human language in which to communicate. Electronic messages and documents remain written in a particular human language, such as German, Spanish, Portuguese, Greek, or English. In many situations, there is a need to quickly identify the human language of a particular document in order to further process the document. For example, identification of the document's human language may help when a user or system attempts to index or classify the document. In another situation, a word processor may need to determine the language of the document in order to use the appropriate spell checking, grammar checking, and language translation tools and libraries.

There are a variety of known methods for identifying the human language of text within an electronic document. In one method, a table is maintained having frequent function words in a variety of human languages. Examples of such frequent function words in the English language may include the words "the," "a," "which," and "you." For a particular document, a count is performed to determine how many of the frequent function words were found for each language. The language having the most frequent function words is identified as the language of the document. Unfortunately, this method typically requires that the section of the document read when determining the language is very long. This is due to the fact that a large amount of input is required before an accurate determination of the document's language can be made. Furthermore, this method becomes problematic when the number of possible languages increases. As the number of possible languages increases, it becomes more difficult to distinguish between languages.

Another method for identifying a document's language uses a set of predetermined rules regarding the occurrence of particular letters or sequences of particular letters that are unique to a specific human language. For example, the letter "å" is unique to the Swedish language. Thus, any document having the letter "å" is determined to be in the Swedish language. In another example, words ending in the letter sequence "çao" are unique to the Brazilian language. However, as with the previous method, the use of a set of predetermined rules can become problematic with a large number of potential languages. Additionally, this method does not perform well with only a limited or small amount of input text.

A third and popular method for identifying a document's language is known as a "tri-gram" method. In the tri-gram method, training documents representing each language are used to create a table or profile for each language, called a tri-gram language profile for each language. More particularly stated, a three-letter window is slid over a training document in a particular language. As the three-letter window is slid over the training document, the method counts the occurrence of the three-letter sequence appearing in the window. This yields a language profile, called a tri-gram language profile, for the particular language that characterizes the appearance of specific three-letter sequences. This is repeated for all of the languages to provide a set of tri-gram profiles for each language. When attempting to determine the language of an unknown document, a similar three-letter window is slid over the unknown document. For each three-letter sequence within the unknown document, the method seeks to find matching three-letter sequences in each of the tri-gram profiles. If a match is found for a particular language, the frequency information within that languages' tri-gram profile for the matched three-letter sequence is added to a cumulative score for the particular language. In this manner, cumulative scores for each language are incremented as the window is slid over the whole unknown document. The language having the highest cumulative score is then deemed the language of the unknown document.

Unfortunately, the tri-gram method is typically computationally intensive when compared to the other two illustrative methods described above. Furthermore, the tri-gram method may have problems accurately identifying the language of a document based on only a small amount of input text from the document.

Some commentators have suggested variations to improve the tri-gram method, such as using longer training documents. Another known improvement uses a similar method to look for either two letters (bi-gram), four letters (quad gram) or some other predefined number of letters within the window. However, all of the above described methods for identifying a document's language typically require relatively large amounts of input text from the unknown document in order to accurately determine the correct language.

Accurately identifying the language of input text can be problematic when the input text is merely a sentence or some other short length of text. For example, it may be desirable to recognize the language of a search query to a World Wide Web search engine on the Internet. The ability to quickly identify the language of the search query allows such a search engine to limit the search to documents that match the language of the search query. Therefore, there is a need for a system for identifying the language of a sample input of text that (1) is quick, (2) remains accurate, and (3) can accurately identify the language when the sample input is very short.

SUMMARY OF THE PRESENT INVENTION

The present invention satisfies the above-described needs by providing a system and method for using multiple sets of language profiles, such as n-gram language profiles, to more accurately identify the language of a sample input of written text. The present invention is especially useful and advantageous when attempting to identify the language of a very short sample input, such as a single sentence or even a word. In general, a reference letter sequence is a sequence of letters, also referred to as an n-gram, that appears with a certain frequency in a particular language. An n-gram profile, more generally referred to as a language profile, maintains a variety of different reference letter sequences (n-grams) of a particular length (such as 3-grams or 4-grams) along with their associated frequencies of occurrence. The frequency at which a reference letter sequence occurs is more generally referred to as a frequency parameter. As such, n-gram profiles include n-gram profiles for each language being considered and may include n-gram profiles having different associated lengths, such as a set of 3-gram profiles and a set of 4-gram profiles for a variety of languages.

In general, the present invention provides a method for using a plurality of n-gram profiles to more accurately identify a language for a sample input of text. Typically, a length of the largest n-gram profile is determined, such as four letters or five letters in length. A window of letters is identified within the sample input, preferably being the length of the largest n-gram profile. If the window contains one or more matches when compared to the reference letter sequences in the n-gram profiles for each language, then the longest match is kept. Typically, the matches contain the first letter within the window.

The longest match is scored as a score for each language based upon a frequency parameter maintained in the n-gram profiles, preferably the n-gram profiles having a length matching the length of the longest match. The frequency parameter is related to the longest match and typically identifies how many times the longest match appears in training data for the particular n-gram profile. Once the longest match has been scored, the window is shifted within the sample input and prior steps of keeping the longest match within the window and scoring the longest match are repeated until the sample input has been completely shifted through the window. After the sample input has been shifted through the window, the language having the highest score is identified as being the language of the sample input of text. As previously stated, the present invention is especially useful when the sample input of text is very short in length.

Additionally, scoring of the longest match may be improved by favoring one of the n-gram profiles over other n-gram profiles. For example, the matches in the longer n-gram profiles may be scored more favorably than matches in the smaller n-gram profiles in order to advantageously give more weight to the discriminating effect in most larger n-gram profiles.

In one aspect, the longest match may be more advantageously scored only if the longest match is longer than a predetermined threshold and is one of a predefined set of words. Typically, the predefined set of words includes words characterized as complete words that are frequent. In other words, the predefined set of words includes complete words having at least a predefined frequency of us for one language. Examples of such complete words that are frequent include the words "the," "a," "which," and "you" in the English language.

Additionally, the longest match may be more advantageously scored by increasing the score if the longest match is simply a complete word. Typically, a complete word is a consecutive sequence of letters having a blank or space in front and in back of the sequence.

In another aspect, the longest match may be more advantageously scored by increasing the score if the longest match has a length greater than a predetermined threshold. Furthermore, the longest match may be more advantageously scored by increasing the score relative to the length of the longest match.

In yet another aspect, the longest match may be more advantageously scored by increasing the score for one of the languages if the frequency parameter indicates that the longest match is found in relatively few of the languages. Additionally, the score for the longest match may be decreased for one of the languages if the frequency parameter indicates that the longest match is found in many languages. This advantageously allows for discrimination of languages relative to the frequency of the longest match occurring in other languages as opposed to simply the frequency of the longest match occurring within the one language.

Additionally, the languages having scores within a predefined percentage of the highest scoring language may be identified as close languages. The steps of identifying the window, keeping only the longest match in the window, scoring the longest match and shifting the window through the sample input may be repeated on a second pass using only the close languages instead of all of the possible languages. This advantageously helps to discriminate between several close languages. Thus, the language of the sample input may be identified based upon the highest score of the close languages.

The present invention also provides a computer-readable medium on which is stored a computer program. The computer program has instructions, which when executed by a computer, performs steps for using n-gram profiles to more accurately identify the language for a sample input of text. When the instructions are executed by the computer, a length associated with the largest n-gram profile is determined. Next, a window of letters is identified at the beginning of the sample input. The window has the same length as the length of the largest n-gram profile. A determination is then made on whether the window contains one or more matches when compared to reference letter sequences in the n-gram profiles for any of the languages. Each of the matches includes the first letter currently within the window. If the window contains one or more matches, then the longest of these matches is kept and scored. The longest match is scored as a score for each language based upon a frequency parameter in the n-gram profiles corresponding to the length of the longest match. This frequency parameter is related to the longest match.

Once the longest match has been scored for each language, the score for each language is added to a cumulative score for each language, respectively. In this manner, the cumulative score for each language is incrementally increased depending on how often the longest match from the sample input appears within each language. After the sample input has been shifted through the window, the language having the highest cumulative score is identified as being the language of the sample input of text.

In another aspect of the present invention, the present invention provides another method for using n-gram profiles to more accurately identify one of a group of languages for a sample input of text. A window of letters is identified within the sample input. If the window contains a match when compared to reference sequences in n-gram profiles for each language, then the match is scored as a score for each language. The value of the score is based upon a frequency parameter in the n-gram profile for each language. The frequency parameter is related to the match. If the frequency parameter indicates that the match is found in relatively few languages, then the score is increased, typically in a logarithmic relationship with respect to the frequency parameter.

Additionally, the score may be decreased if the frequency parameter indicates that the match is found in relatively many of the languages. Increasing or decreasing the score in this manner is advantageous because it allows better discrimination in identifying languages with infrequently appearing reference letter sequences.

Furthermore, the score may be normalized relative to the frequency parameter when compared to a highest score in all the languages for the match if the frequency parameter indicates that the match is found in relatively few of the languages. Thereafter, the sample input is shifted through the window so that different letters can be matched and scored as described above. Once the sample input has been shifted through the window, the language having the highest score is identified as being the language of the sample input.

The present invention also provides a method for creating a modified set of language profiles. First, a highest frequency is determined for a reference letter sequence in an initial set of language profiles. If the highest frequency is less than a predetermined threshold, then the reference letter sequence is removed from all of the language profiles in the initial set, typically by removing an entry of the reference letter sequence from each language profile in the initial set.

However, if the highest frequency is not less than the predetermined threshold, a variable threshold is advantageously set for the reference letter sequence. The value of the variable threshold is based upon a value of the predetermined threshold and a value of the highest frequency. If the highest frequency not less than a multiple of the predetermined threshold, then the value of the variable threshold may be set to be the same value as the predetermined threshold. Additionally, if the highest frequency is less than the multiple of the predetermined threshold, the value of the variable threshold may be set to be a fraction of the value of the predetermined threshold. Thus, the variable threshold is advantageously set in a dynamic fashion depending upon the content of the language profiles. This is desirable because it allows for further modification of the initial set of language profiles on a language-by-language basis for the reference letter sequence.

If the reference letter sequence in one of the language profiles has a frequency that is less than the variable threshold, the reference letter sequence is removed from that particular language profile, typically by removing an entry for the reference letter sequence from the particular language profile. In this manner, the modified set of language profiles is created from the initial set of language profiles.

The present invention also provides a method for determining whether an active keyboard format associated with a keyboard is improper using an initial sample input of text. First, the initial sample input is transposed according to the active keyboard format into a transposed sample input according to a alternative keyboard format. Next, the language of the transposed sample input is identified. Typically, the language of the initial sample input is identified and the language of the transposed sample input is identified.

If the language of the transposed sample input is identified as being supported by keyboard, the active keyboard format is determined to be improper and the active keyboard format may then be switched to the alternative keyboard format. More particularly stated, a determination may be made as to whether the initial sample input's language and the transposed sample input's language are supported by the keyboard. If the transposed sample input's language is supported and the initial sample input's language is not supported, then the active format of the keyboard may be switched to the alternative keyboard format.

Additionally, the active keyboard format may be determined to be propel if the language of the transposed sample input cannot be identified. Furthermore, the language of the initial sample input may be identified. If the language of the transposed sample input cannot be accurately identified and if the language of the initial sample input is identified as being supported by the keyboard, then the active keyboard format is determined to be proper.

The present invention and its advantages, those described above and otherwise, will be appreciated from studying the following detailed description and drawings, and the appended claims.

BRIEF DESCRIPTION OF THE DRAWINGS

FIG. 9A is a diagram illustrating an example of initial sample text in an active format of a switchable keyboard in an exemplary embodiment of the present invention.

FIG. 9B is a diagram illustrating an example of transposed sample text in an alternative format of a switchable keyboard in an exemplary embodiment of the present invention.

DETAILED DESCRIPTION

The present invention improves the ability of a standard tri-gram method (discussed in more detail below with regard to FIG. 2) to accurately and quickly identify the language of a document using only a small sample portion of the document, such as a few words or a single sentence. The present invention does so by using a combination of multiple length n-gram language profiles (not just one tri-gram profile) with the ability to favor scoring of matched reference letter sequences in one type of n-gram profile over another type of n-gram profile in the combination, normalization techniques, and establishing minimum thresholds for accurate scoring. Furthermore, the present invention also uses such methods of identifying the language of a small sample text to handle keyboard language format mixups.

In general, a reference letter sequence is a sequence of letters, commonly called an n-gram, that appears with a certain frequency in a particular language. An n-gram profile, more generally referred to as a language profile, maintains a variety of different reference letter sequences (n-grams) of a particular length (such as 3-grams or 4-grams) along with their associated frequencies of occurrence. The frequency at which a reference letter sequence occurs is more generally referred to as a frequency parameter. As such, n-gram profiles include n-gram profiles for each language being considered and may include n-gram profiles having different associated lengths, such as a set of 3-gram profiles and a set of 4-gram profiles for a variety of languages.

The preferred embodiment of the present invention is represented by a language identifier (ID) program module developed by Microsoft Corporation of Redmond, Washington designed to work with Microsoft Corporation's "WORD" word processing application program module in conjunction with Microsoft Corporation's "WINDOWS 95" and "WINDOWS NT 4.0" operating systems. Briefly described, the language ID program module is a program module that quickly identifies the language of a document using only a small sample input portion of the document. The aspect of more accurately identifying the language of a document using only a small sample input is the focus of the present invention.

Figure 1:
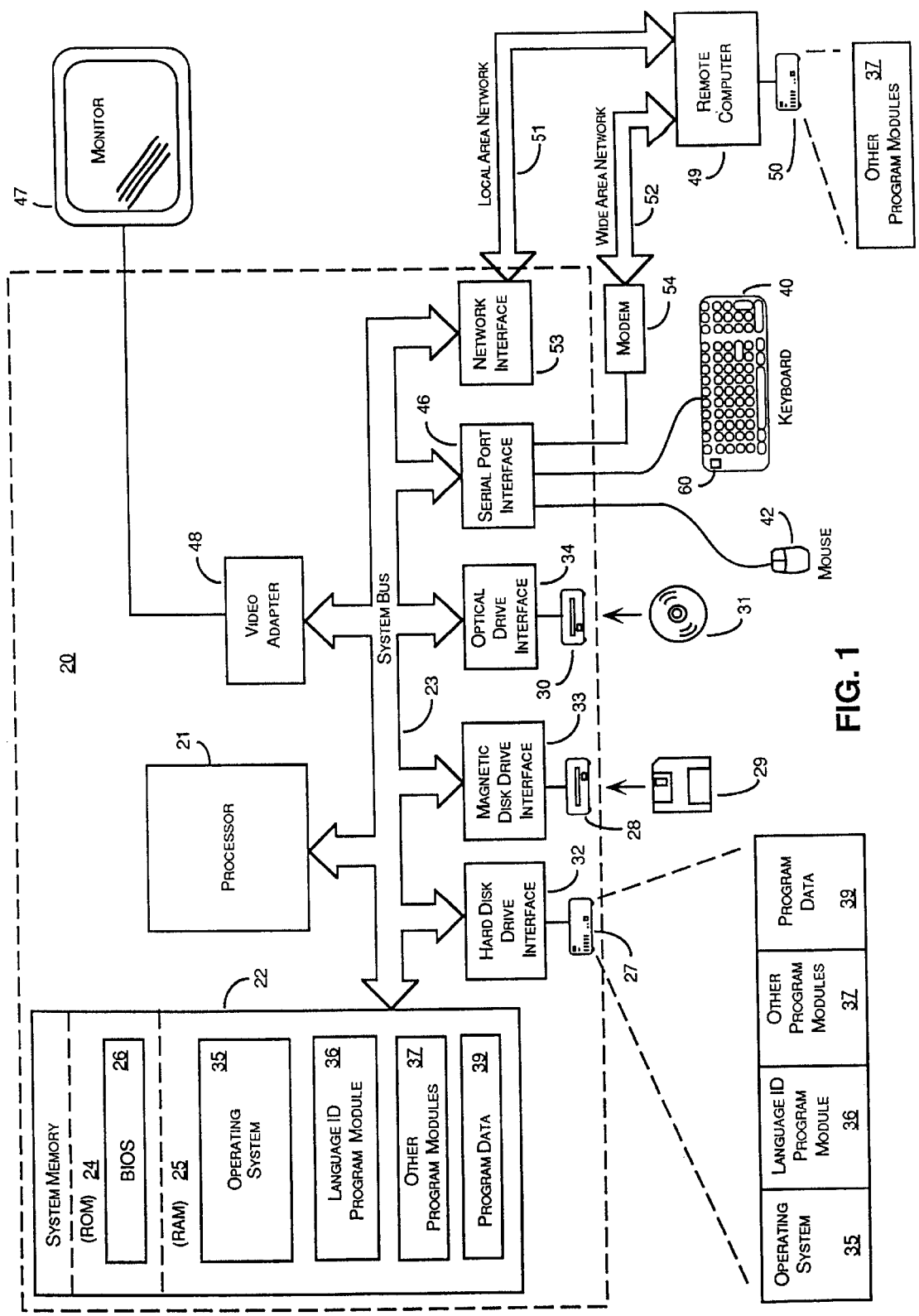
FIG. 1 is a block diagram of a personal computer that provides an exemplary operating environment for an embodiment of the present invention.
Figure 2:
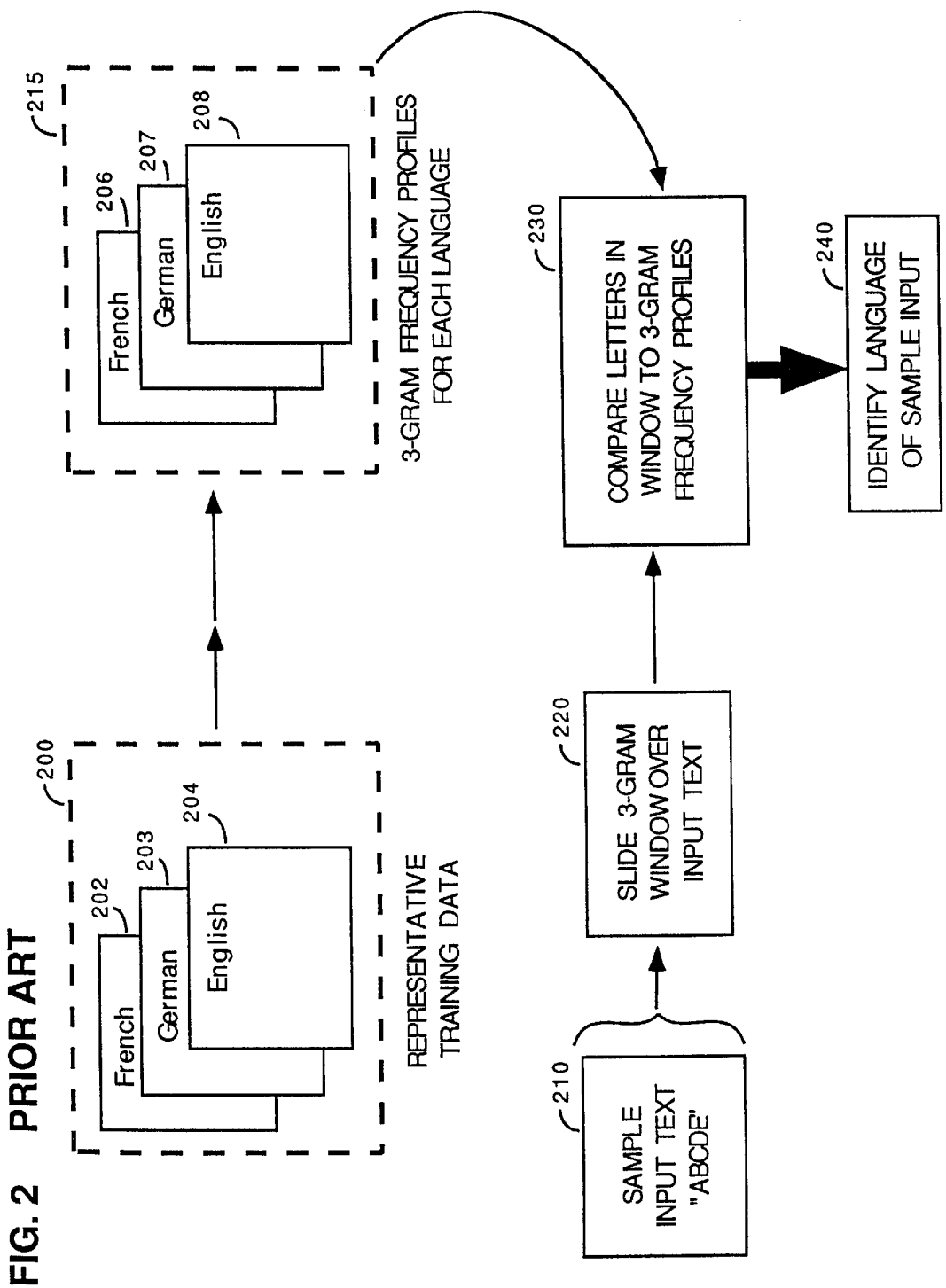
FIG. 2 is a diagram conceptually illustrating a tri-gram method from the prior art for identifying the language of a document.
Figure 3:
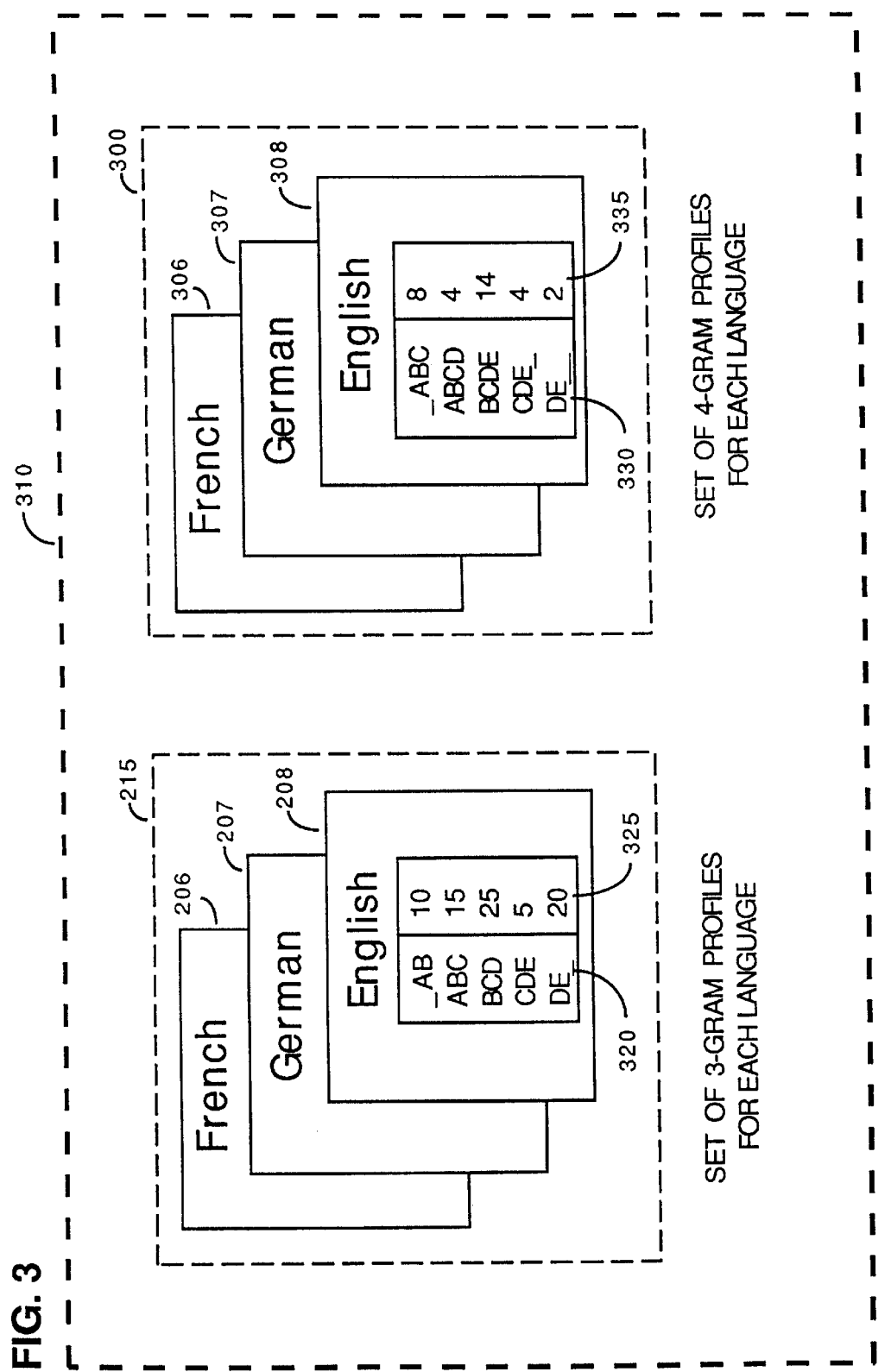
FIG. 3 is a diagram illustrating multiple n-gram profiles in an exemplary embodiment of the present invention.
Figure 4:
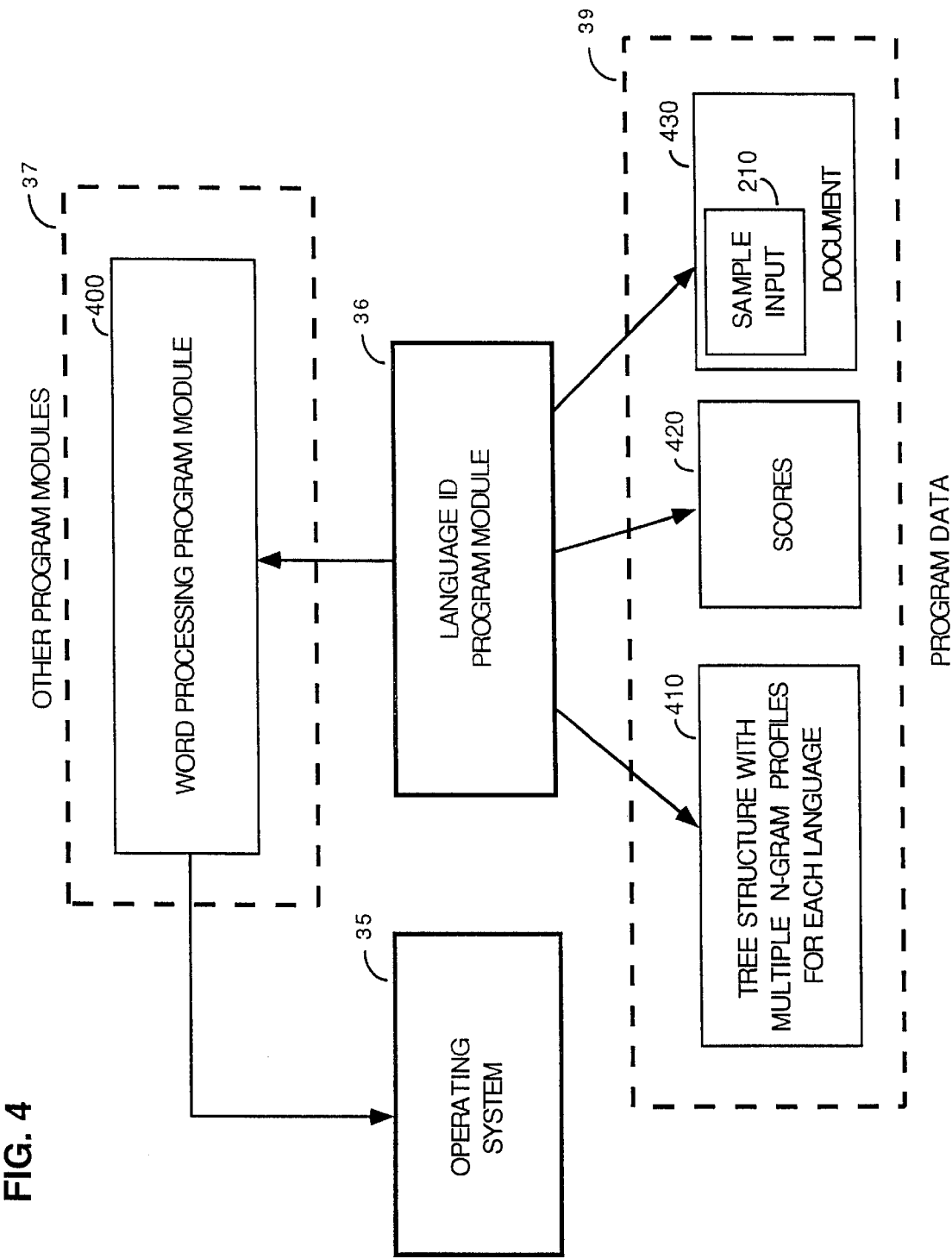
FIG. 4 is a diagram illustrating an exemplary language identifier program module and how it interacts with other program modules and program data in an exemplary embodiment of the present invention.
Figures 9A, 9B:
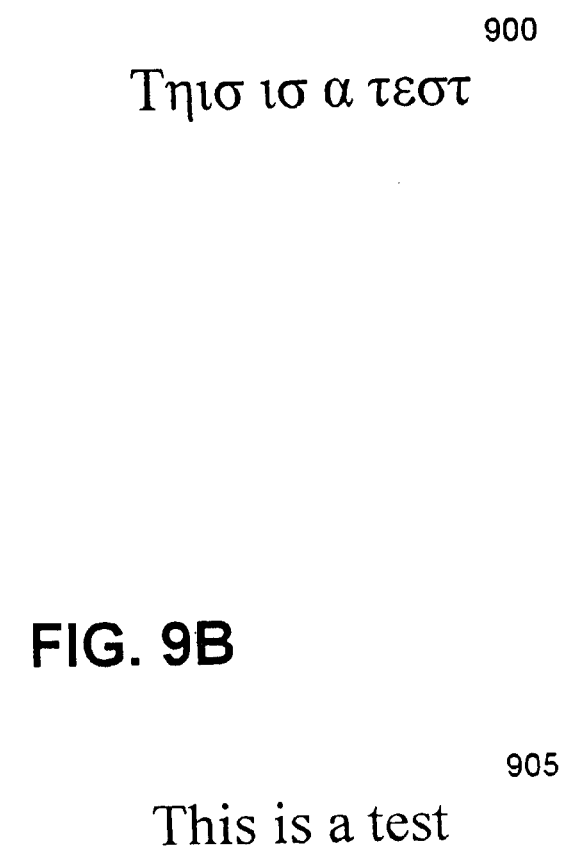
Figure 10:
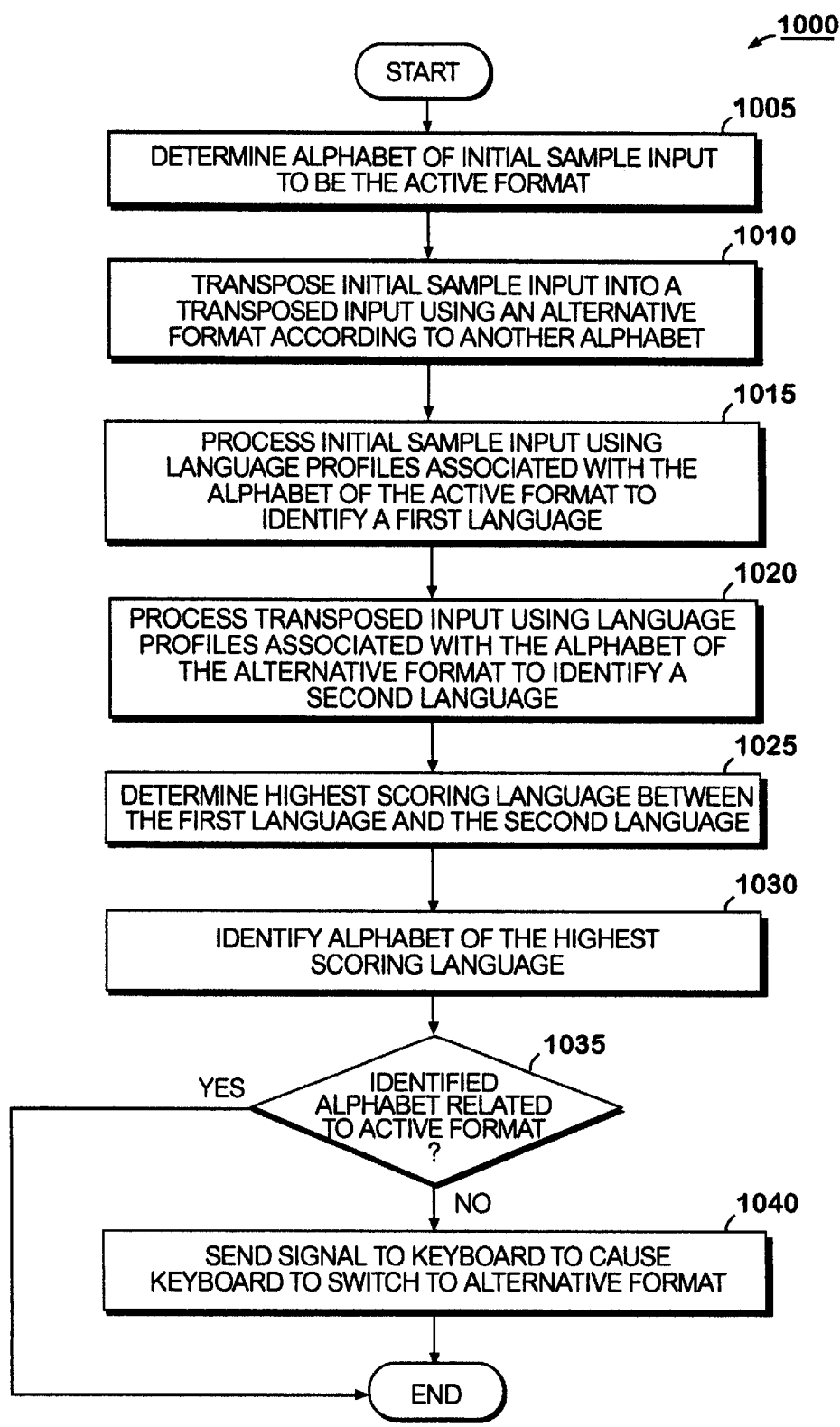
FIG. 10 is a flow diagram illustrating the preferred steps for dynamically handling a keyboard format error in an exemplary embodiment of the present invention.

In FIG. 1, the operating environment for an embodiment of the present invention is illustrated. FIG. 2 illustrates a prior art method know as a "tri-gram" method for identifying the language of a document. FIG. 3 is a diagram illustrating exemplary multiple n-gram profiles used in an improvement to the standard tri-gram method. FIG. 4 is a diagram of software modules, including the language ID program module. FIGS. 5–8 are flow diagrams describing steps for exemplary improved methods for identifying the language of a small sample of a document. FIGS. 9A and 9B illustrate transposing the sample input text when dynamically handling keyboard format errors. FIG. 10 is a flow diagram describing steps for dynamically handling keyboard format errors using such methods of identifying the language of a sample input.

The detailed description which follows is represented largely in terms of processes and symbolic representations of operations by a conventional computer. The processes and operations performed by the computer include the manipulation of signals by a processor and the maintenance of these signals within data structures resident in one or more media within memory storage devices. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, objects, blocks, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as searching, determining, accessing, updating, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, data structures (such as tables or tree structures), etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 37 (such as a word processing program module), a language identifier (ID) program module 36, and program data 39 (such as sample input text from a document and a tree structure of language profiles) used by program modules.

The operating system 35, in conjunction with the BIOS 26 and associated device drivers, provides the basic interface between the computer's hardware and software resources, the user, and program modules, such as the language ID program module 36. A user may enter commands and information into the personal computer 20 through a keyboard 40 and an input or pointing device, such as a mouse 42.

In the exemplary operating environment for the present invention, the keyboard 40 supports multiple language formats and is selectably switchable. For example, in one format, the keyboard 40 may support the English or Latin alphabet in one format. However, in response to depressing a selection switch 60 or receiving a signal sent to the keyboard 40, the keyboard 40 is able to switch to an alternative format, such as the Greek alphabet.

Other input devices (not shown) may include a microphone, a key pad, a touch sensor, a joystick, a game pad, a satellite dish, a scanner, or the like. The keyboard 40, mouse 42, and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

As discussed earlier, the preferred embodiment of the present invention is embodied in a program module that works in conjunction with Microsoft Corporation's "WINDOWS 95" and "WINDOWS NT" operating systems. However, it should be understood that the invention can be implemented for use with other operating systems, such as IBM Corporation's "OS/2" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

Likewise, those skilled in the art will appreciate that the language ID program module 36 provides a wide variety of features and functions in addition to aspects described below with respect to an embodiment of the present invention.

Standard Tri-Gram Method for Language Identification

As previously mentioned, embodiments of the present invention improve upon a standard tri-gram method in order to more accurately identify the language of a document using only a small sample input of the document. FIG. 2 is a conceptual diagram illustrating a tri-gram method from the prior art for identifying the language of a document.

Referring now to FIG. 2, a series of conceptual blocks and processing descriptions are illustrated to explain a standard or conventional tri-gram method for identifying the language of a document. First, the tri-gram method must essentially be "taught" characteristics of each possible language that are to be recognized. Training data 200 representing each of these possible languages is used to create a set of tri-gram language profiles 215 for each language. As discussed in more detail below, a tri-gram language profile maintains information regarding how many times a specific letter sequence occurs in the training data 200 for a particular language. The training data 200 is defined as any document that is representative of words normally used in that particular language. It is preferable to have lengthy training data 200 in order to adequately populate a tri-gram profile as discussed in more detail below. In the exemplary embodiment, the average length of such representative training data 200 is approximately 500,000 characters (including spaces) per language.

More particularly stated, in order to create a set of tri-gram language profiles 215, a three-letter window is slid over a particular training document, such as a French document 202. As the three-letter window is slid over the French document 202 one letter at a time, frequency parameters are recorded counting each occurrence of the three-letter sequence, more generally called a reference letter sequence, appearing in the window. For example, if the French document 202 begins with the letters "ABCABCKLM," the "ABC" letter sequence would appear within the three-letter window twice while the "KLM" letter sequence would appear only once. As the three-letter window is slid over the entire French document 202, a language profile is created that represents how often certain reference letter sequences occur in the particular language. This information is more generally referred to as reference letter sequences and their associated frequency parameters within a tri-gram language profile for the particular language. Thus, in the above example, a tri-gram or "3-gram" language profile 206 is created for the French language.

This same training process is repeated for each of the languages to provide a set of tri-gram language profiles 215 covering the languages to be recognized. Referring back to the above example, the set of tri-gram language profiles 215 is rounded out by processing a representative German document 203 to yield a 3-gram language profile 207 for German and processing a representative English document 204 to yield a 3-gram language profile 208 for English.

Once the set of tri-gram language profiles 215 for the different languages has been created, the language of an unknown document can be identified. When attempting to determine the language of an unknown document, a similar three-letter window is slid over a text sample, also called a sample input text 210, of the unknown document in step 220. At step 220, for each three-letter sequence within the sample input text 210, a three-letter sequence of letters (reference letter sequence) is sought out and compared in each of the tri-gram language profiles to match the sequence of letters (test letter sequence) in the window. If a match is found in a tri-gram language profile for a particular language, the frequency parameters for the matched three-letter sequence in that profile are added to a cumulative score for the particular language. For example, the letters "ABC" may appear in the three-letter window as a sequence of letters from the sample input text 210. The French tri-gram language profile 206 may have a match to the letters "ABC" and frequency parameters associated with the reference letter sequence "ABC" of 100. The German tri-gram language profile 207 may not have a match to the test letter sequence of "ABC." However, the English tri-gram language profile 208 may have a match to the letters "ABC" and frequency parameters associated with the reference letter sequence "ABC" of 200. Thus, for the test letter sequence of "ABC," the cumulative score for French would increment by 100 and the cumulative score for English would increment by 200 while the cumulative score for German would remain the same.

As the letters within the three-letter window are shifted bringing a test letter sequence of "BCD" within the window, matching reference letter sequences are sought from the tri-gram language profiles and then are scored to increment the appropriate languages. This process is repeated as the window is gradually slid over the whole sample input text 210 in order to increment the cumulative scores for each languages.

Once the whole sample input text 210 has been processed in this manner in steps 220 and 230, the language having the highest cumulative score is then deemed to be the language of the document at step 240.

Using a Combination of N-Gram Profiles

In order to improve the accuracy and speed when identifying the language of a document, a combination of different sized n-gram profiles is used to advantageously identify the language of a document. While it is known in the art to individually use a different length n-gram profile (such as a 4-gram or 2-gram) other than a tri-gram profile (3-gram) in the above described method, the present invention is able to cleverly use multiple length n-gram language profiles at the same time in order to quickly and more accurately identify the language of a document. Using a combination of multiple length n-gram profiles helps to identify shorter letter sequences (more frequent, but less helpful) and longer letter sequences (less frequent, but more helpful) common in a particular language. FIG. 3 is a diagram illustrating multiple length n-gram language profiles in an exemplary embodiment of the present invention.

Referring now to FIGS. 2 and 3, a set of 3-gram language profiles 215 for each language and a set of 4-gram language profiles 300 for each language are illustrated, more generally referred to as language profiles. As previously discussed, the set of 3-gram language profiles 215 includes reference letter sequences 320 of three letters that appear in the training data 200 accompanied by frequency parameters 325 indicating how often the particular reference letter sequence appeared in the training data 200.

The set of 4-gram language profiles 300 is similarly created but instead of using a three-letter window of letters, a four-letter window of letters is used. Thus, the set of 4-gram language profiles 300 includes reference letter sequences 330 of four letters that appear in the training data 200 accompanied by frequency parameters 335 indicating how often the particular reference letter sequence of four letters appeared in the training data 200.

Collectively, the set of 3-gram language profiles 215 and the set of 4-gram language profiles 300 are referred to as multiple length n-gram language profiles. The multiple length n-gram language profiles 310 are typically maintained within a table or some other data structure organized in such a way as to be convenient to the process using the n-gram language profiles. In the exemplary embodiment, the multiple length n-gram language profiles 310 are maintained within a conventional tree structure. Those skilled in the art will appreciate that a conventional tree structure is a data structure that is linked together in a hierarchical fashion. For example, the tree structure maintaining the multiple length n-gram language profiles 310 may have child nodes immediately off a root node where the child nodes represent the different length sets of n-gram language profiles 215, 300.

Each of these sets of n-gram language profiles may have a different length associated with them. For example, the set of 3-gram language profiles 215 has an associated length of three while the set of 4-gram language profiles 300 has an associated length of four. While the exemplary multiple length n-gram language profiles 310 include n-grams of length three and four for ease of discussion, the present invention contemplates using multiple length n-gram language profiles of length two or more. In an exemplary embodiment, multiple length n-gram language profiles 310 preferably include n-grams (reference letter sequences) of length two through seven for each of the supported languages.

Software Module Interactions

An aspect of the present invention is how the sample input text 210 from the document is read and processed by the exemplary language ID program module 36 so that a language of the document can be quickly and accurately determined. Given the above preface on the conventional tri-gram method and multiple length n-gram language profiles 310, an improvement to such a tri-gram method using multiple length n-gram language profiles can be best described in terms of how modules interact with the exemplary language ID program module 36. FIG. 4 is a diagram illustrating a language identifier program module and how it interacts with other program modules and program data.

Referring now to FIGS. 1–4, the exemplary language ID program module 36 reads a sample input text 210 of a document 430 in an unknown language. In the exemplary embodiment, the sample input text 210 may be a very short length of text, such as a single sentence or a single word. While the sample input text 210 is illustrated as being a part of a document 430 in FIG. 4, the sample input text 210 may be the entire document 430. In other words, the document 430 and the sample input text 210 may be only a very short length of text.

Once the sample input text 210 has been read, the language ID program module 36 determines the length of the largest n-gram profile in a tree structure 410. For example, if the tree structure 410 maintains 3-gram, 4-gram, and 5-gram language profiles, the largest n-gram profile would have a length of five.

Next, the language ID program module 36 slides a window over the beginning of the sample input text 210. The window has the same length as the length of the largest n-gram frequency table. For example, the initial five letters within the window may be "ABCDE." This five letter sequence of letters is typically referred to as the test letter sequence.

The language ID program module 36 looks within the largest of the n-gram profiles in the tree structure 410 for a match to the test letter sequence. If there is not a reference letter sequence within any of the largest n-gram profiles that matches the test letter sequence, then the test letter sequence is made smaller and the language ID program module 36 searches for a match in the next smaller set of n-gram profiles within the tree structure 410. Once a match is found, the match is scored according to the frequency parameters within the corresponding length n-gram language profiles. In this manner, only the longest of the matches is kept and scored within a given position of the window within the sample input text 210.

In our example using 3-gram, 4-gram, and 5-gram language profiles, the sample input text 210 may begin with a sequence of letters of "ABCDEFGH." The window identifies the first five letters of the sample input text 210 corresponding to the length of the largest of the n-gram language profiles in the tree structure 410 (the set of 5-gram language profiles). If the test letter sequence of "ABCDE" appears as a reference letter sequence in any of the 5-gram language profiles, then "ABCDE" is scored with cumulative scores 420 for each of the languages using the set of 5-gram language profiles. After the test letter sequence has been scored for each language, the window is shifted over the letters of the sample input text 210. Thus, in the example, the next letters appearing within the window would be "BCDEF."

However, if the test letter sequence of "ABCDE" does not match any of the reference letter sequences in the set of 5-gram language profiles, the test letter sequence is reduced by a letter to the next smaller sequence having the same first letter, i.e., "ABCD." A match for this new test letter sequence is sought from set of 4-gram language profiles. If a match is found, the match is scored as described above, but using the frequency parameters in the set of 4-gram language profiles instead. If no match is found, the same process is performed so that the set of 3-gram language profiles is searched to match a test letter sequence "ABC."

In summary, the language ID program module 36 is looking for the longest match to the test letter sequence of letters appearing in the window. Once a long match is found and is subsequently scored for each language, the "lesser included" or smaller matches are essentially ignored and processing of the rest of the sample input text 210 continues.

Once the end of the sample input text 210 is reached, the language having the highest cumulative score 420 is deemed to be the language of the sample input 210 and, thus, the document 430. This information may be transmitted by the language ID program module 36 to other program modules 37, such as a word processing program module 400. The word processing program module 400 may be able to advantageously use this information in order to load the correct spell checking tools and grammar checking tools in the appropriate language of the document 430.

Furthermore, the language ID program module 36 can be used to identify and correct keyboard format errors. The language ID program module 36 is capable of recognizing that the active keyboard format is improper when the language of words being typed on the keyboard 40 cannot be identified while a transposed version of those words in an alternative format of the keyboard 40 can be identified with a supported language of the keyboard 40. In one embodiment, the language ID program module 36 notifies the word processing program module 400 of the improper keyboard format. The word processing program module 400 then either prompts the user to manually depress the selection switch 60 on the keyboard, prompts the user to input a predefined control sequence, or autonomously sends a signal to the keyboard 40 to switch to the alternative format via the operating system 35. In another embodiment, the language ID program module 36 itself is able to prompt the user to manually depress the selection switch 60, prompt the user to input the predefined control sequence, or send the signal to the keyboard 40 via the operating system 35. Such dynamic handling of keyboard format errors is discussed in more detail below with regard to FIGS. 9A, 9B, and 10.

Multiple N-Gram Profiles

Figure 5:
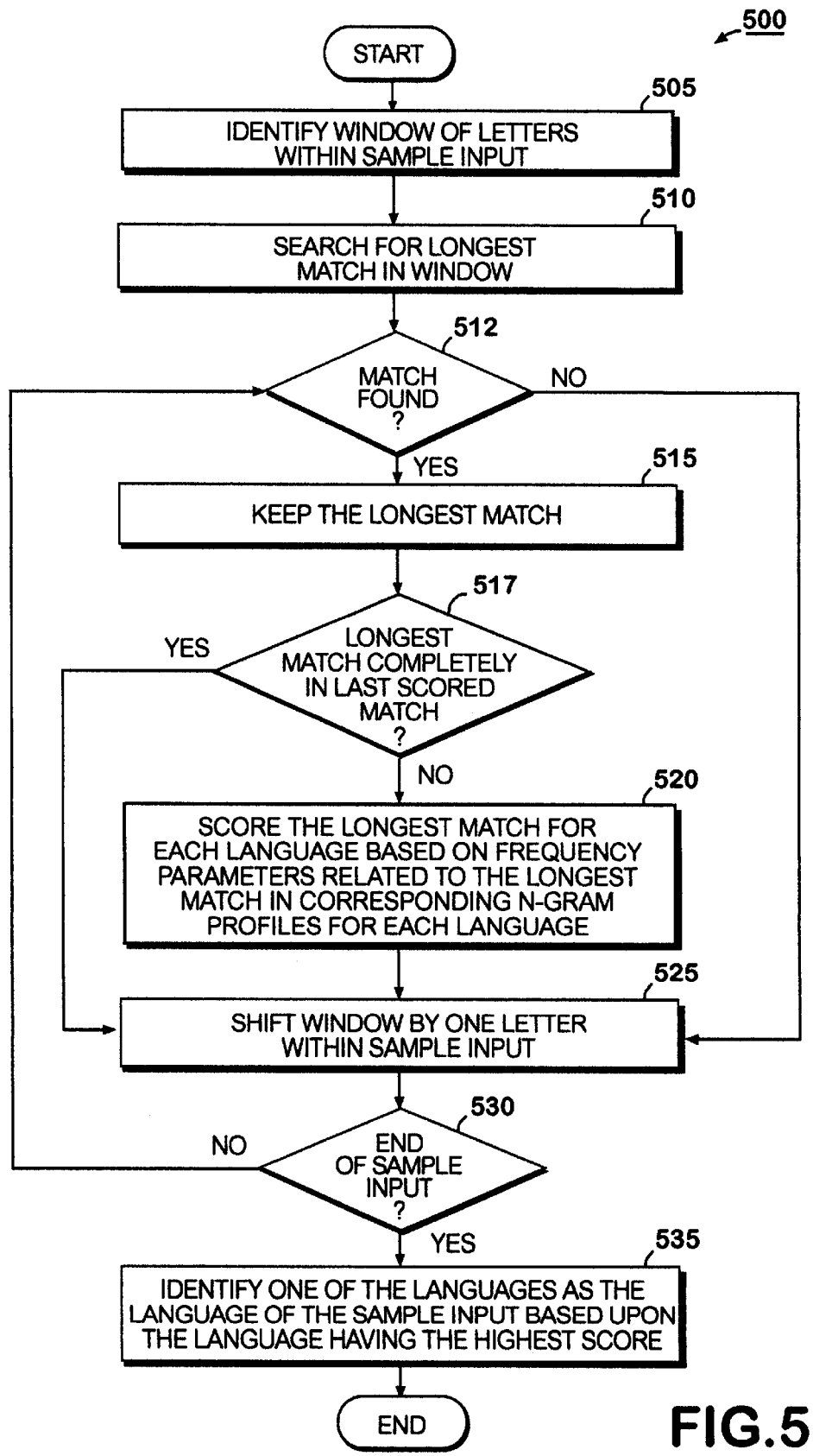
FIG. 5 is a flow diagram illustrating the preferred steps for more accurately identifying the language of a sample input of text using multiple n-gram profiles in an exemplary embodiment of the present invention.

In the context of the above description of the language ID program module 36, the following is a description of the preferred steps performed to more accurately identify the language of a sample input text 210 from such a document 430. FIG. 5 is a flow diagram illustrating the preferred steps for more accurately identifying the language of a sample input of text using multiple n-gram profiles in an exemplary embodiment of the present invention.

Referring now to FIGS. 1–5, the method 500 begins at step 505 where a window of letters within a sample input is identified. In other words, a window is placed over the letters of the sample input of text to produce a set of windowed letters. It is the windowed letters from the sample input that are identified within step 505. Preferably, the length of the window corresponds to the largest of the n-gram language profiles. In the example above, a window is placed over the first five letters of the "ABCDEFGH" sample input to produce a set of windowed letters "ABCDE" that is identified at step 505.

At step 510, a search is conducted to determine the longest match of letters within the window to reference letter sequences within the multiple sets of n-gram language profiles. In other words, the search determines whether the window contains one or more matches to reference letter sequences within the multiple sets of n-gram language profiles. In this manner, once a match is found within the window, searching for smaller matches is not required. For example, if the window contains a test letter sequence (letters within the windowed letters) of "ABCDE" and the set of 5-gram language profiles contains a reference letter sequence of "ABCDE" in its German and English language profiles, a match has been found. Additionally, the set of 4-gram language profiles contains a reference letter sequence of "ABCD" in its German, French, and English language profiles. While the letters "ABCD" do not exactly match the letters "ABCDE" contained within the window, the important point in step 510 is that the letters "ABCD" are found in a sequence within the letters contained within the window.

At step 512, if the window does not contain any matches, step 512 proceeds directly to step 525. However, if the window contains one or more matches, step 512 proceeds to step 515 where the longest match is kept in working memory. In our example, the longest match is the "ABCDE" match. It is five letters long when compared to the other matches of four letters long. Thus, only the "ABCDE" match that was found in the set of 5-gram language profiles is kept. The other "lesser included" matches are disregarded.

At step 517, if the longest match was already included in the last scored match, then step 517 proceeds to step 525 because scoring the current longest match would be redundant. However, if the longest match was not included in the last scored match, then step 517 proceeds directly to step 520.

At step 520, the longest match is scored for each of the languages. The scoring is based upon the frequency parameters related to the longest match in the corresponding length n-gram profiles for each of the languages. In other words, the letters of the longest match are the same as a reference letter sequence in the appropriate length set of n-gram language profiles. The frequency parameters used to score the longest match are maintained within the appropriate length set of n-gram language profiles for each language. In the example started above, the "ABCDE" match is scored for each of the German and English languages according to how many occurrences the reference letter sequence "ABCDE" appears in the training data, i.e., the frequency parameters for the reference letter sequence "ABCDE." If the frequency parameters for "ABCDE" in the 5-gram language profile for German are 100, then the longest match of "ABCDE" is scored as 100 for the German language. If the frequency parameters for "ABCDE" in the 5-gram language profile for English are 50, then the longest match of "ABCDE" is scored as 50 for the English language. Given that there was no reference letter sequence matching "ABCDE" in the French 5-gram language profile, the longest match of "ABCDE" is scored as zero for the French language.

At step 525, the window is shifted by one letter within the sample input before proceeding to step 530. In the example, the window is shifted over the sample input to include the letters "BCDEF" of the sample input.

At step 530, if the end of the sample input has been reached, then step 530 proceeds to step 535. In the example, the end of the sample input would include the letters "DEFGH." Otherwise, step 530 proceeds back to step 510 to determine if there are any matches within the new sequence of letters within the window.

In an exemplary embodiment, the window is shifted by one letter to the right until the left edge of the window reaches the end of the sample input. If the right edge of the window is located past the end of the sample input, we move the right edge of the window one character to the left. For example, if the end of the sample input is "xxx$_{13}$ the" and you consider 2-grams to 7-grams, then all possible reference letter sequences of length two to seven are considered in order to squeeze as much information from the sample input as possible. These possible reference letter sequences include the following letter sequences:

"xxx_the", "xxx_th", "xxx_t", "xxx_", "xxx", "xx",

"xx_the", "xx_th", "xx_t", "xx_", "xx",

"x_the", "x_th", "x_t", "x_",_

"_the", "_th", "_t",

"the", "th", and

"he".

At step 535, the entire sample input has been processed by steps 510 through 530. Additionally, the scores for each of the languages have been incrementally increased based on the longest matches found within the window as it is shifted through the sample input. At this point, one of the languages is identified as the language of the sample input based upon the language having the highest score. Thus, the highest scoring language is the language having the most occurrences of the reference letter sequences in that particular language.

Figure 6:
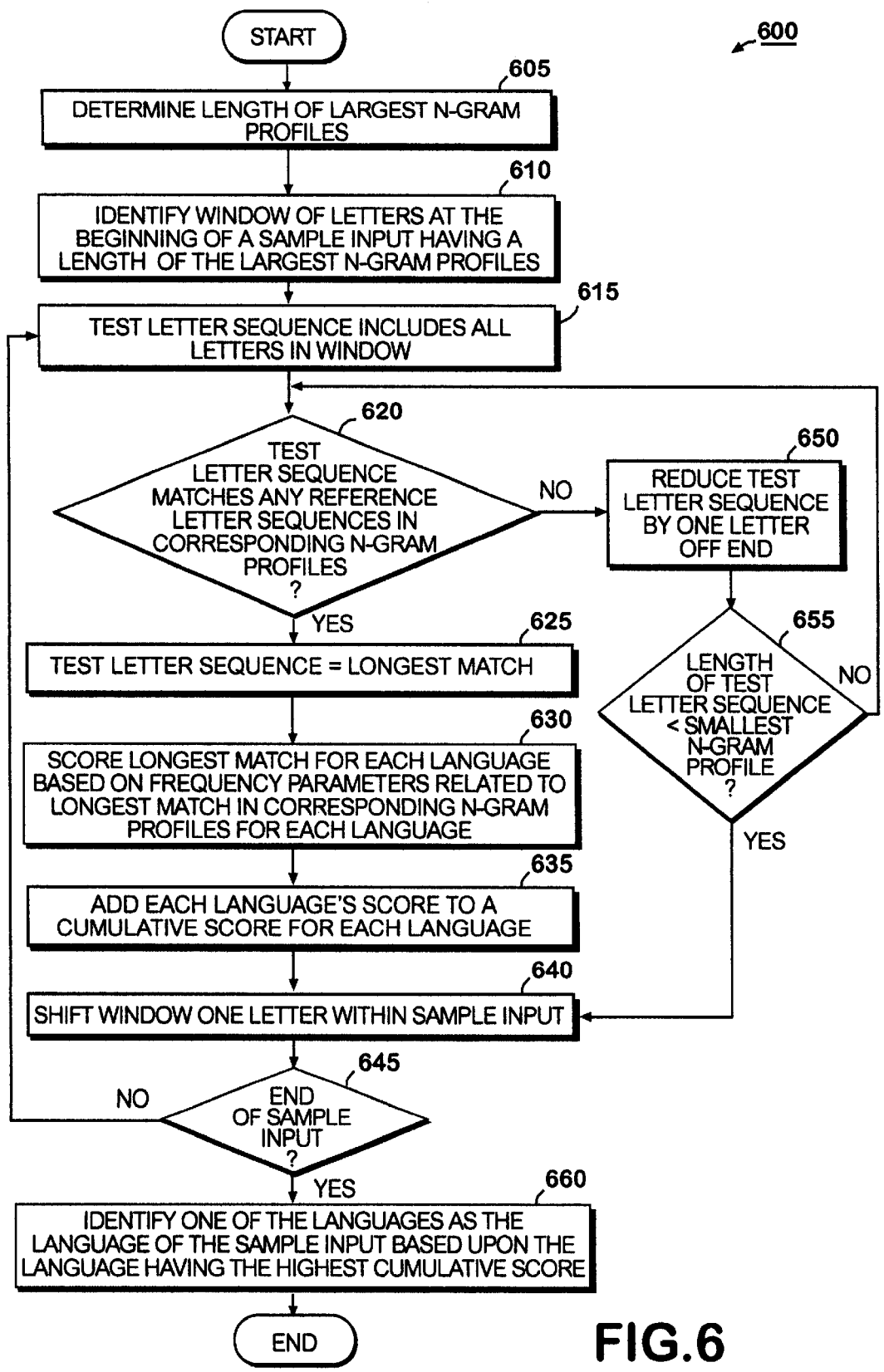
FIG. 6 is a detailed flow diagram illustrating the preferred steps for more accurately identifying the language of a sample input of text using multiple n-gram profiles in an exemplary embodiment of the present invention.

FIG. 6 is a more detailed flow diagram illustrating the preferred steps for more accurately identifying the language of a sample input of text using multiple n-gram profiles in an exemplary embodiment of the present invention. Referring now to FIGS. 1–6, the method 600 begins at step 605 where a length of the largest of the n-gram language profiles is determined.

At step 610, a window of letters at the beginning of a sample input is identified. The length of the window corresponds to the length of the largest of the n-gram language profiles. In order to identify the window of letters, the window is typically placed over the letters of the sample input of text to produce a set of windowed letters. It is the windowed letters from the sample input that are identified within step 610.

At step 615, the test letter sequence includes all of the letters appearing within the window. At step 620, a determination is made on whether the test letter sequence matches any reference letter sequences within a corresponding length set of n-gram language profiles. For example, if the test letter sequence is "ABCDE" and the corresponding set of 5-gram language profiles contains a reference letter sequence of "ABCDE" in its German and English language profiles, a match has been found.

If the test letter sequence does not match any reference letter sequences in step 620, then step 620 proceeds to step 650 where the test letter sequence is reduced by one letter off the end of the test letter sequence. In the example, if the "ABCDE" test letter sequence has no matches to any reference letter sequences in the set of 5-gram language profiles, then the "ABCDE" test letter sequence is reduced by one letter to "ABCD" before proceeding to step 655. At step 655, if the test letter sequence has been reduced below a length of the smallest n-gram profile, then it is deemed that there is no match within the window and the window is shifted one letter within the sample input at step 640. If the test letter sequence has not yet been reduced below a length of the smallest n-gram profile, then step 655 proceeds back to step 620 to attempt to find a match for the new test letter sequence.

However, if the test letter sequence matches any of reference letter sequences in step 620, then step 620 proceeds to step 625 where the current test letter sequence is determined to be the longest match. Thus, the combination of steps 620, 625, 650, and 655 represent steps 510 and 515 from FIG. 5.

At step 630, the longest match is scored for each language. The scoring for each language is based on frequency parameters related to the longest match in the corresponding length n-gram profiles for each of the languages. In other words, the letters of the longest match are the same as a reference letter sequence in the appropriate length set of n-gram language profiles. The frequency parameters used to score the longest match are maintained within the appropriate length set of n-gram language profiles for each language.

For example, the "ABCDE" match is scored for each of the German and English languages according to how many occurrences the reference letter sequence "ABCDE" appears in the training data, i.e., the frequency parameters for the reference letter sequence "ABCDE." If the frequency parameters for "ABCDE" in the 5-gram language profile for German are 100, then the longest match of "ABCDE" is scored as 100 for the German language. If the frequency parameters for "ABCDE" in the 5-gram language profile for English are 50, then the longest match of "ABCDE" is scored as 50 for the English language. Given that there was no reference letter sequence matching "ABCDE" in the French 5-gram language profile, the longest match of "ABCDE" is scored as zero for the French language.

At step 635, each language's score is then added to a cumulative score for the language. In this manner, as test letter sequences in the window are found to match reference letter sequences in the appropriate length n-gram language profiles and are correspondingly scored, the scores for each of the languages are individually tracked.

At step 640, the window is shifted one letter within the sample input to essentially drop off a letter and to add a new letter to the end of the letter sequence in the window. This is conventionally accomplished by incrementally sliding the window over the sample input to include the next letter of the sample input and remove the first letter previously within the window. For example, when the sample input is "ABCDEFGH" and the window contains the letters "ABCDE", the "A" drops off and a new letter "F" is added to the end of the sequence when the window is incrementally slid over the sample input at step 640. Thus, in the example, the new letter sequence is "BCDEF" within the window.

At step 645, if the end of the sample input has been reached, then step 645 proceeds to step 660. Otherwise, step 645 proceeds back to step 615 to set the test letter sequence to be the new sequence of letters within the window.

At step 660, the entire sample input has been processed and the cumulative scores for each of the languages have been incrementally increased based on the longest matches found within the window as the window is shifted through the sample input. At this point, one of the languages is identified as the language of the sample input based upon the language having the highest cumulative score. Thus, the highest scoring language is the language having the most occurrences of the reference letter sequences in that particular language.

Improvements to Scoring Using Multiple Length Profiles

In addition to the aspect of using multiple length n-gram profiles to identify the language of a sample input of a document, the present invention contemplates other improvements which improve the ability to identify the language of the sample input. In general, these improvements concern the scoring aspect of the above process by favoring a set of n-gram language profiles over another set of n-gram language profiles.

In one aspect, the scores using smaller n-gram language profiles are left unmodified. However, according to this improvement, the scores using n-gram language profiles greater than a predetermined threshold are modified to count only if the match is one of a set of predefined words, such as complete words. In the exemplary embodiment, a test letter sequence is characterized as having a complete word when the sequence has two or more non-consecutive blanks. In other words, a complete word has a space in front of the letters and a space in back of the letters. For example, the test letter sequence "_AND_" may be deemed a complete word when the "_" denotes a space or blank in the sample input. Additionally, a frequent word is defined as a word having a frequency above a predefined frequency of occurrence or use in a particular language.

In the exemplary embodiment, the predetermined threshold has empirically been determined to be five in order to best improve accuracy in language identification. In the exemplary embodiment, complete words include frequent function words. As previously mentioned, examples of such frequent function words in the English language may include the words "the," "a," "which," and "you." In this way, the method advantageously minimizes the computational resource strain from larger n-gram processing. Thus, limiting the scoring of matches in the greater length n-gram language profiles to full and complete words is one way in which to enhance the accuracy and performance of quickly identifying the language of the sample input using multiple n-gram language profiles.

In another aspect, the score of a particular match is boosted or increased if the match is a complete word, as defined above. The score of such a match is boosted or increased by an empirically determined amount. In one embodiment, the amount in which to increase such a match of a complete word is implemented by increasing the score of the match by a factor of three. In another embodiment the increase is achieved via a calculated decrease to a match's score if the match is not a complete word. The amount of such a calculated decrease is not crucial. It is important to understand that the key concept is to value the complete word more relative to matches of other reference letter sequences that are not complete words.

In yet another aspect, the scoring of a match is modified to favor frequency parameters from longer matches when compared to frequency parameters from shorter matches. This may be accomplished by increasing the score of a match if the match has a length longer than a predetermined threshold.

In one embodiment, the score is increased when the match is longer than three letters, the preferred predetermined threshold. Again, the actual amount of such an increase is not crucial. It is merely important to understand that above the predetermined threshold, the scores using the larger n-gram language profiles are increased to give them greater weight in the scoring process. For example, in one embodiment, the score of a match using the set of 3-gram language profiles is left unchanged. However, the score of a match using the set of 4-gram language profiles may be doubled when compared to what is normally scored based on the frequency parameters in the 4-gram language profiles. Additionally, the score of a match using the set of 5-gram language profiles may be tripled when compared to what is normally scored using the frequency parameters in the 5-gram language profiles.

In another embodiment, the score is effectively increased by actually decreasing the score of a match when the match is relatively short instead of increasing the score for longer matches. For example, exemplary sets of n-gram language profiles include sets of 2-gram profiles, 3-gram profiles, 4-gram profiles, and 5-gram profiles. If a reference letter sequence is matched in the set of 5-gram profiles, then the score for the match is unmodified. If the reference letter sequence is matched in the set of 4-gram profiles (i.e., has a length of 4 letters), then the score for the match is decreased by a factor. In the above example, the factor may be determined according to formula (1):

$$\text{score}=\text{score}/((\text{length\_largest\_ngram}+1)-\text{length\_matched\_ngram}) \quad (1)$$

Accordingly, the score for the matched reference letter sequence in the 4-gram profiles is divided by 2. Similarly, a score for a match in the 3-gram profiles is divided by 3 and a score for a match in the 2-gram profiles is divided by 4.

Those skilled in the art will easily realize that the scores for longer matches relative to scores for shorter matches are increased in such a situation. Additionally, language identification performance can be further enhanced by allowing any complete word, as described above, to remain scored the same despite being a shorter match.

Two Pass Improvements for Identifying Language

In another improvement, a two pass method is used to help differentiate between close languages. Essentially, the scores for each of the possible languages are determined in a first pass. For example, a first pass of the window over the sample input may yield scores for the languages as follows: German 1000, French 900, and English 850. The languages that are within a predefined percentage of the highest scoring language are identified as "close languages" and will be included in a second pass of the window through the sample input. In an exemplary embodiment, the preferred predefined percentage has been empirically determined to be ten percent. In the example mentioned above, the German language is the highest scoring language and the French language has a score within a predefined percentage, such as ten percent, of the German score. The English score is outside the predefined percentage, thus excluding it from the group of close languages.

After the close languages have been determined, a second pass of the window through the sample input is performed. During this second pass, only the reference letter sequences in n-gram language profiles associated with the close languages are considered. This effectively drops the non-close languages from contention and from all potential scoring during the second pass. After the second pass, the highest of the scores amongst the close languages is identified as the language of the sample input. Thus, performing two passes as described allows for a more distinctive and advantageous comparison between close scoring languages and enhanced accuracy.

Normalized Scoring Improvements using N-Grams

In addition to the above described improvements, scoring of a match can be further improved by normalizing across all of the languages. Some infrequent reference letter sequences within n-gram language profiles may be extremely useful to discriminate between languages only to be lost in the larger scores of the frequent reference letter sequences.

In the exemplary embodiment, a normalized score within a language is computed based upon the log of a score that is then mapped back to a more usable range of numbers, such as zero to 255. More particularly stated, in the exemplary embodiment, the frequency parameter of a reference letter sequence is mapped to a number from zero to 255 to yield a temporary score as defined by formula (2):

$$\text{scoreTemp}=1+((\text{frequency\_of\_this\_ngram}*254)/(\text{total\_number\_of\_ngrams}*\text{percentage\_of\_occurence\_of\_most\_frequent\_ngram})) \quad (2)$$

Next, a logarithm of the temporary score is calculated and used to map the score to a number from zero to 255 as shown in formula (3):

$$\text{score}=\log(\text{scoreTemp})*(255/\log(255)) \quad (3)$$

In this manner, normalization within a particular language can be implemented to boost the score of infrequent reference letter frequencies.

Furthermore, it is advantageous to have the frequency parameters within an n-gram language profile contribute to the score for a match based on the match's relative frequency across each of the languages and not just within a particular language. Generally stated, a matched reference letter sequence is scored in a normalized manner based upon its relative frequency across the languages. If the match is found in relatively few languages, then the score for the match is increased or boosted. This gives more scoring weight to reference letter sequences that are relatively infrequent in the various languages but also have a high power of discriminating between languages.

In the exemplary embodiment, a normalized score across the languages is computed based upon the log of a score that is then mapped back to a more usable range of numbers, such as zero to 255. More particularly stated, in the exemplary embodiment, the frequency parameter of a reference letter sequence is mapped to a number from zero to 255 to yield a temporary score as defined by formula (4):

$$\text{scoreTemp}=\text{frequency\_of\_sequence}*255/(\text{sum\_of\_frequency\_for\_this\_sequence\_across\_the\_languages}) \quad (4)$$

Thus, the temporary score is a normalized score based upon the frequency of the matched reference letter sequence in each of the n-gram profiles for each of the languages being considered. Next, a logarithm of the temporary score is calculated and used to map the score to a number from zero to 255 as shown in formula (5):

$$\text{score}=\log(\text{scoreTemp})*(255/\log(255)) \quad (5)$$

In this manner, normalization across the languages can be implemented to boost the score of infrequent reference letter frequencies relative to their frequency of occurrence in all of the languages.

The above described normalization technique may be better understood using an example. In the example, if the sample input is "DEFGXYZHI," scoring of this text sample for traditional tri-gram language profiles in Portuguese and Spanish may be reflected in Table 1 as follows:

TABLE 1

| Reference Letter Sequence | Portuguese | Spanish |
|---|---|---|
| DBF | 100 | 95 |
| EFG | 75 | 80 |
| GXY | 105 | 110 |
| XYZ | 20 | 5 |
| ... | ... | ... |

As shown in Table 1, the reference letter sequences matched for "DEF," "EFG," and "GXY" provide frequency parameters that contribute to large scores for both of the languages with only small relative differences between the scores. The reference letter sequence matched for "XYZ" provides frequency parameters that contribute only a small amount to each language's score. It is important to note that the relative difference of the score for "XYZ" between the languages shows the ability to discriminate between the languages. However, the large scores of the other matches and the small score of the infrequent match "XYZ" make the difference indiscernible after the scores are accumulated. Thus, the scores are cleverly increased during the scoring steps for relatively infrequent matches of reference letter sequences capable of providing discrimination between the languages.

One way in which to increase the scores is to normalize the scores across the languages. In the exemplary embodiment, the scores for each matched reference letter sequence are normalized, preferably on a scale of zero to 255, to indicate the relative frequency of the match across the languages. In the example above, the scores would be modified by altering the scores to a normalized score relative to the scores for that particular match in each of the languages, as shown below in Table 2:

TABLE 2

| Reference Letter Sequence | Portuguese Normalized Score | Spanish Normalized Score |
|---|---|---|
| DEF | 255 | 250 |
| EFG | 250 | 255 |
| GXY | 248 | 255 |
| XYZ | 255 | 50 |
| ... | ... | ... |

Therefore, the scores of the "XYZ" matched reference letter sequence in each of the languages contributes more to distinguishing Portuguese from Spanish as the language of the sample input.

Figure 7:
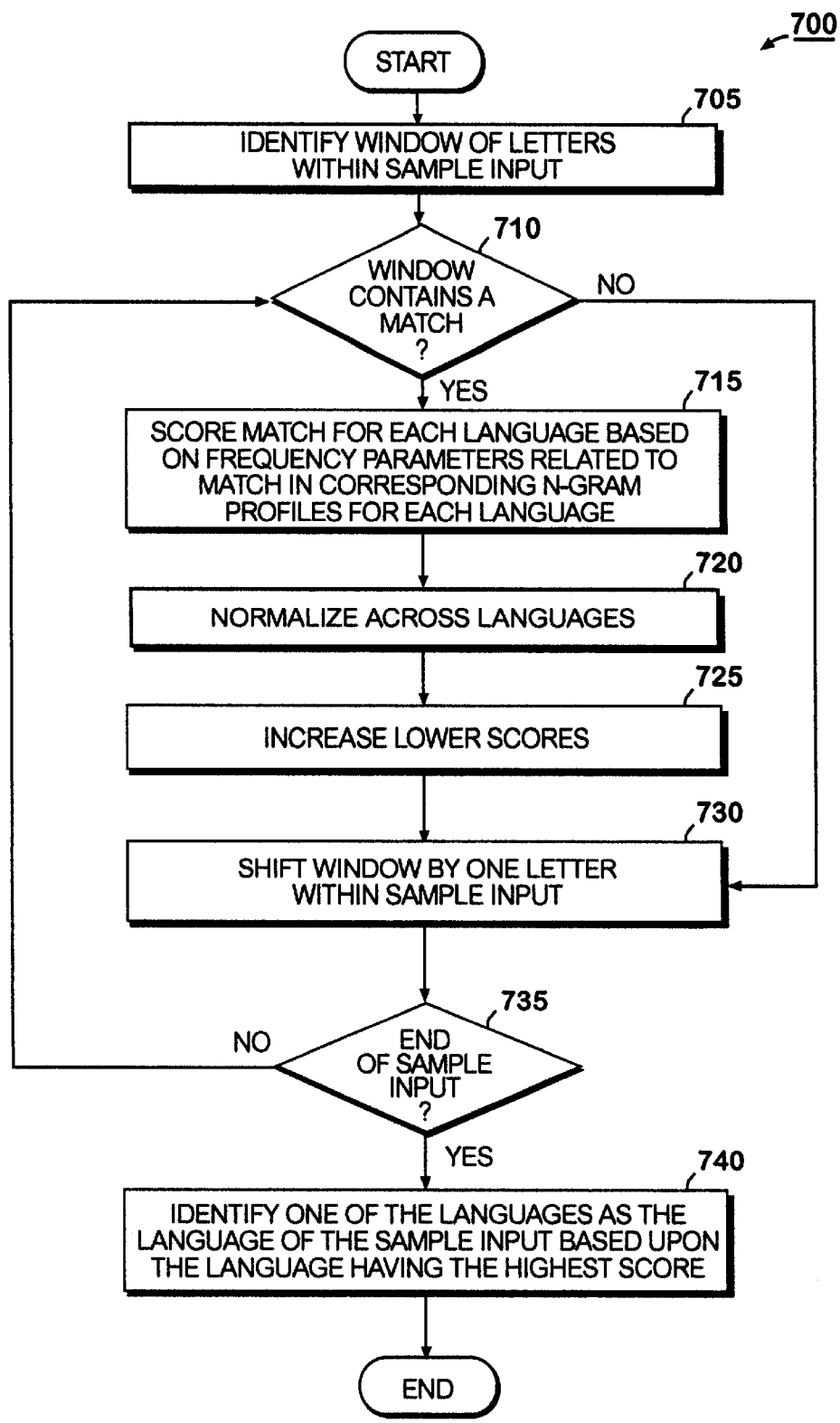
FIG. 7 is a flow diagram illustrating the preferred steps for more accurately scoring matched letters based on the relative frequency of the matched letters in all languages in an exemplary embodiment of the present invention.

FIG. 7 is a flow diagram illustrating the preferred steps for more accurately scoring matched letters, such as reference letter sequences, based on the relative frequency of the matched letters in all languages in an exemplary embodiment of the present invention. Referring now to FIGS. 1–7, the method 700 begins at step 705 where a window of letters within a sample input is identified.

At step 710, a determination is made whether the window contains a match to reference letter sequences within the one or more sets of n-gram language profiles. For example, if the window contains the letters "XYZ," then a match for the letters "XYZ" is sought in the n-gram language profiles.

If the window does not contain a match, step 710 proceeds directly to step 730. However, if the window contains a match, step 710 proceeds to step 715 where the match is scored for each of the languages. The scoring is based upon the frequency parameters related to the match in the corresponding length n-gram profiles for each of the languages. In other words, the letters of the match are the same as a reference letter sequence in the appropriate length set of n-gram language profiles. The frequency parameters used to initially score the match are maintained within the appropriate length set of n-gram language profiles for each language.

In the example started above, the "XYZ" match is scored for each of the Portuguese and Spanish languages according to how many occurrences the reference letter sequence "XYZ" appears in the training data, i.e., the frequency parameters for the reference letter sequence "XYZ." If the frequency parameters for "XYZ" in the tri-gram language profile for Portuguese are 20, then the match of "XYZ" is initially scored as 20 for Portuguese. If the frequency parameters for "XYZ" in the tri-gram language profile for Spanish are 5, then the match of "XYZ" is scored as 5 for Spanish.

At step 720, the score for the match is normalized across the languages. In the exemplary embodiment, the frequency parameters are normalized to a number between 0 and 255 as described above.

At step 725, lower scores are boosted. In the exemplary embodiment, the score is increased in a logarithmic relationship to the frequency parameter in order to give greater weight to lower frequencies. These increased and preferably normalized scores are individually tracked, preferably with a cumulative score, for each language. In this manner, the relative value of reference letter sequences that appear only in a few languages can also be increased by actually decreasing the value of the frequently appearing reference letter sequences.

At step 730, the window is shifted one letter within the sample input before proceeding to step 735. At step 735, if the end of the sample input has been reached, then step 735 proceeds to step 740. Otherwise, step 735 proceeds back to step 710 to determine if there is a match within the new sequence of letters within the window.

At step 740, the scores for each of the languages have been incrementally increased based on the matches found within the window as it is shifted through the sample input. Some of these scores have been increased, preferably normalized, in step 725 to better reflect a discriminating difference amongst the scores across all the languages for a particular match. At this point, one of the languages is identified as the language of the sample input based upon the language having the highest score. Thus, less frequent matches having a better discriminating effect on the language of the sample input is reflected in the scoring of the languages.

Minimum Thresholds for Improving Language ID

When the frequency parameter of a reference letter sequence is low for a particular language, that reference letter sequence is unlikely of being indicative of that language. In the worst case, the reference letter sequence is just noise generated by sliding the window on "nonsense" strings of letters in the training text. The nonsense strings could, for example, come from mathematical formulas, quotations in foreign languages, and uncommon expressions such as a "qwerty" keyboard. To limit the number of reference letter sequences under consideration, and get rid of the noisy ones, it is known in the art to have a general minimum threshold below which reference letter sequences are discarded. However, a problem with this general idea is that an arbitrary cut off point may lead to errors due to the lack of context on how the cut off point is established. An improvement can be made to provide such context through the use of dual thresholds that are dynamically and intelligently set to account for such context.

In general, for a particular set of language profiles (e.g., the set of tri-gram language profiles 215), the reference letter sequences are sorted to determine the highest frequency across the languages for a particular reference letter sequence. If the highest frequency is less than a predetermined threshold, then the entries for the particular reference letter sequence are removed from all of the language profiles. In the exemplary embodiment, it has been determined that setting the predetermined threshold to approximately ten is optimum based on the length of the training data 200 typically used to populate the language profiles.

Conceptually, this predetermined threshold attempts to keep the content of the language profiles that convey information and discard the content that may be considered noise. This avoids useless or wasteful processing when attempting to identify the language of a small amount of text. For example, Table 3 describes the contents of a sorted set of language profiles, more particularly, a sorted set of 3-gram language profiles for the English, German, and French languages.

TABLE 3

| English Language Profile | German Language Profile | French Language Profile |
|---|---|---|
| AAA - 9 | AAA - 4 | AAA - 3 |
| AAZ - 100 | AAZ - 60 | AAZ - 215 |
| ABB - 12 | ABB - 4 | ABB - 2 |
| ... | ... | ... |

The sets of language profiles are essentially sorted per language according to frequency to help determine the highest frequency for a given reference letter sequence.

In the first row of Table 3, the reference letter sequence "AAA" appears accompanied with a frequency parameter in each of the language profiles. The highest of the frequency parameters for the "AAA" reference letter sequence is a frequency of "9" in the English language profile. If the predefined threshold is "10", then the highest frequency for the "AAA" reference letter sequence is less than the predetermined threshold. Accordingly, each of the "AAA" reference letter sequence entries are removed from all of the languages (i.e., from the English profile, the German profile, and the French profile). This effectively trims out some of what can be considered waste from all of the language profiles. There is no need to consider the "AAA" reference letter sequence anymore. Accordingly, each of the "AAA" reference letter sequence entries are removed from all of the languages (i.e., from the English profile, the German profile, and the French profile).

In the second row of Table 3, the reference letter sequence "AAZ" appears accompanied with a frequency parameter in each of the language profiles. The highest of the frequency parameters for the "AAZ" reference letter sequence is a frequency of "215" in the French language profile. If the predefined threshold is again "10", then the highest frequency for the "AAZ" reference letter sequence is not less than the predetermined threshold.

At this point, a variable threshold for "AAZ" is set depending upon the value of the lowest frequency for "AAZ" reference letter sequence that is just greater than the value of the predetermined threshold. In an exemplary embodiment, the variable threshold is a fraction, preferably one-fourth, of the value of the lowest frequency just greater than the predetermined threshold. In this manner, the variable threshold is dynamically set and is capable of further culling out "noise-level" reference letter sequences when the highest frequency is above the first or predetermined threshold. Accordingly, referring back to the example in the second row of Table 3, the value of the variable threshold for the "AAZ" reference letter sequence is set to "15," which is one-fourth the value of the lowest frequency ("60") greater than the predetermined threshold ("10") for the "AAZ" reference letter sequence.

Once the value of the variable threshold is set, a determination is individually made on a "language-by-language" basis as to whether to keep "AAZ" in each of the language profiles. Accordingly, the "AAZ" reference letter sequence remains in English language profile because "100" is greater than "15," the value of the variable threshold. The "AAZ" reference letter sequence also remains in German language profile because "60" is greater than "15." Similarly, the "AAZ" reference letter sequence remains in French language profile because "215" is greater than "15."

In the third row of Table 3, the variable threshold may help further trim out reference letter sequences on the language-by-language basis. Referring now to the third row of Table 3, the reference letter sequence "ABB" appears accompanied with a frequency parameter in each of the language profiles. The highest of the frequency parameters for the "ABB" reference letter sequence is a frequency of "12" in the English language profile. If the predefined threshold is again "10", then the highest frequency for the "ABB" reference letter sequence is not less than the predetermined threshold.

The variable threshold for "ABB" is then set to "3," which is one fourth the value of the lowest frequency ("12") above the predetermined threshold ("10") for the "ABB" reference letter sequence. A determination is individually made on the "language-by-language" basis as to whether to keep "ABB" in each of the language profiles. Accordingly, the "ABB" reference letter sequence remains in English language profile because "12" is greater than "3," the value of the variable threshold. The "ABB" reference letter sequence also remains in German language profile because "4" is greater than "3." However, the "ABB" reference letter sequence is removed from the French language profile because "2" is less than "3," the variable threshold. Thus, it is advantageous to dynamically set and use a variable threshold because it allows for a more advantageous modification of the initial set of language profiles. This modification enhances language identification by not allowing unreliable language identification.

Figure 8:
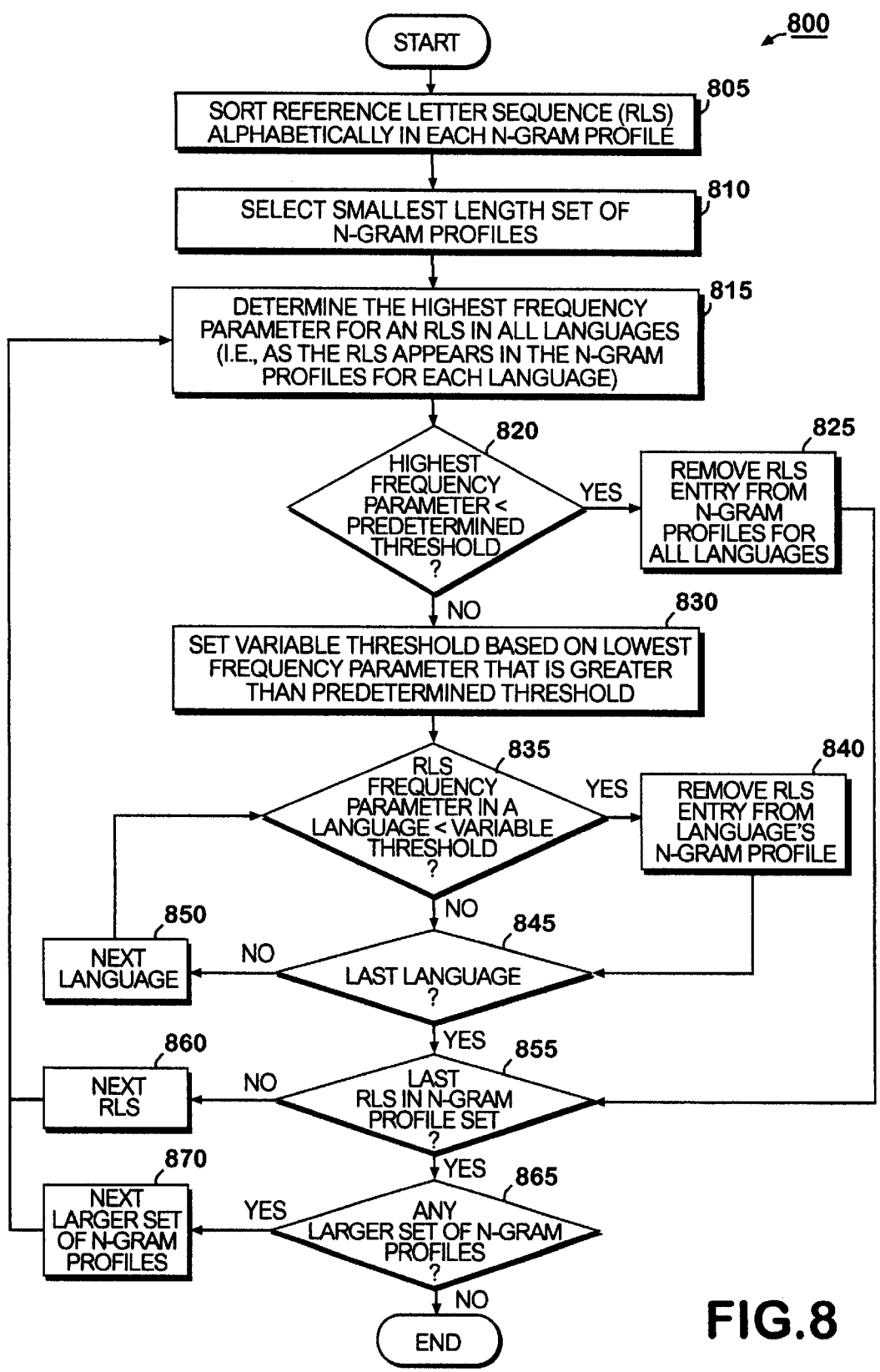
FIG. 8 is a flow diagram illustrating the preferred steps for creating a modified set of language profiles in an exemplary embodiment of the present invention.

In the context of the above dual threshold example from Table 3, FIG. 8 is a flow diagram illustrating the preferred steps for creating a modified set of n-gram language profiles based on the dual threshold concept. Referring now to FIG. 8, the method 800 begins at step 805 where the reference letter sequences (RLS) in each n-gram profile are sorted alphabetically. For example, the 3-gram reference letter sequences in each of the languages are sorted alphabetically with the "AAA" reference letter sequence sorted to be first. Additionally, the n-gram profiles may collectively include sets of profiles for longer n-gram reference letter sequences, such as 4-grams, 5-grams, or 6-grams.

At step 810, a smallest length set of n-gram profiles is selected as a starting point. At step 815, the highest frequency parameter for a reference letter sequence in the selected set of n-gram profiles is determined for all of the languages.

At step 820, if the highest frequency parameter is less than a predetermined threshold, such as the value ten, then step 820 proceeds to step 825. Otherwise, step 820 proceeds directly to step 830.

At step 825, an entry for the reference letter sequence is removed from all of the language profiles. This is done because none of the frequency parameters for the reference letter sequence in any of the language profiles are high enough to impart enough information to be considered reliable discriminators of language. After removing the entries for the reference letter sequence from all of the language profiles, step 825 proceeds directly to step 855.

At step 830, a variable threshold is set to dynamically establish a finer and more contextual threshold level. In an exemplary embodiment, the variable threshold is set based on the lowest frequency greater than the predetermined threshold for the particular reference letter sequence. More specifically, the variable threshold is set to be only a fraction, preferably one-fourth, the value of the lowest frequency greater than the predetermined threshold for the particular reference letter sequence.

In an alternative embodiment, the variable threshold is set depending on the value of the highest frequency and the value of the predetermined threshold. The value of the variable threshold is set to be the same as the predetermined threshold if the highest frequency is relatively high compared to the predetermined threshold. More particularly stated, the variable threshold is set to be the value of the predetermined threshold if the highest frequency parameter is not less than a multiple, preferably four, of the predetermined threshold. In this manner, when the highest frequency is much higher than the predetermined threshold, the same threshold value is applied to each language (via the variable threshold) on a language-by-language basis.

In yet another alternative embodiment, the variable threshold is set to be less than the predetermined threshold if the highest frequency is just above the predetermined threshold. More particularly stated, the variable threshold is set to be only a fraction, preferably one fourth, the value of the predetermined threshold if the highest frequency parameter is less than the multiple of the predetermined threshold.

In summary, the variable threshold is dynamically set in order to more effectively modify the content of the language profiles on a language-by-language basis.

Basically, steps 835–850 implement trimming the language profiles on a language-by-language basis. At step 835, if a frequency parameter for the reference letter sequence in one of the languages is less than the particular reference letter sequence's variable threshold, then step 835 proceeds to step 840. Otherwise, step 835 proceeds directly to step 845.

At step 840, an entry for the reference letter sequence is removed from that particular language's profile. After removing the entry for the reference letter sequence from this particular language profile, step 840 proceeds directly to step 845.

At step 845, if there are other languages having the reference letter sequence that have not yet gone through step 835, then step 845 proceeds to step 850 where the next language is identified (i.e., the reference letter sequence in the next language profile is identified) and then back to step 835. However, if the are no other languages and the last language has been processed through step 835, step 845 proceeds directly to step 855.

At step 855, processing of the next reference letter sequence commences. If the reference letter sequence that was previously processed in steps 815–850 was not the last reference letter sequence in the language profile, step 855 proceeds to step 860 where the next reference letter sequence is identified in the language profile and then back to step 815. The order in which specific reference letter sequences are processed is not critical. However, in the exemplary embodiment, the reference letter sequences are processed in an alphabetical order merely as a design choice.

If the reference letter sequence that was previously processed in steps 815–850 was the last reference letter sequence in the current set of n-gram language profiles, step 855 proceeds directly to step 865.

Steps 865 and 870 essentially allow similar processing steps to occur for other length language profiles (i.e., sets of 4-gram language profiles, 5-gram language profiles, etc.). At step 865, if there are any larger sets of n-gram language profiles that have not yet been processed, then step 865 proceeds to step 870 where the next larger set is selected before proceeding back to step 815.

In summary, a dual threshold approach, such as the method 800 illustrated in FIG. 8, allows an improvement to language identification accuracy when dealing with short sentences in languages that are similar, such as Portuguese, Spanish and Italian, or Norwegian, Danish and Swedish.

Identifying Language in Keyboard Format Error Handling

In another aspect, traditional and improved methods for identifying the language of a sample input can be used to dynamically handle keyboard format errors. This is enhanced when the method for identifying the language of the sample input can do so with only a very small amount of text in the sample input. As previously mentioned, the language format of conventional keyboards, such as the keyboard 40 illustrated in FIG. 1, is known to be selectable by typing a specific key combination on the keyboard. In other words, the keyboard can be selectably switched to type two or more different alphabets associated with different languages. Users sometimes forget they have not selected the appropriate format of the language in which they are typing. For example, the user may assume the keyboard 40 is typing in an English format when the keyboard 40 may have an active format of the Greek alphabet. This leads to text being input in a language that is unrecognizable.

A known way of handling keyboard format mix-ups is to create new pseudo languages for each possible keyboard format mix-up. For example, on a Greek/English keyboard, the same key allows you to type the letter "a" or the letter "alpha". A pseudo language can be created where all "a"s are transposed to "alpha"s. The same type of transposition occurs for all the letters in the English language into letters in the Greek language. This gives you a "Greekized English" pseudo language that you can use to build a "Greekized English" language profile. Accordingly, when the score of an input is computed, the score on the "Greekized English" language is included. The main problem with this approach is that the number of language profiles rapidly increases to an undesirable level with an increase in the number of possible keyboard formats.

For example, a user may be interested in ten languages. Eight of these ten languages use the Latin alphabet, one uses the Greek alphabet, and one uses the Cyrillic alphabet. If the user is interested in the Latin/Greek and Latin/Cyrillic keyboard format mix-ups, the number of language profiles needed rapidly increases to twenty-eight for the following original and pseudo languages:

8 original Latin alphabet languages
  8 greekized Latin languages (for Greek/Latin mixups)
  8 cyrillicized Latin languages (for Russian/Latin mixups)
  1 original Greek language
  1 latinized Greek language (for Latin/Greek mixups)
  1 original Cyrillic language
  1 latinized Cyrillic language (for Latin/Russian mixups)

Thus, there is a need to quickly recognize the language of text and correct such keyboard format mixups or errors without having to create pseudo languages for each potential type of keyboard format error. Having to create so many pseudo languages undesirably wastes computer resources such as memory and processing time.

In general, to solve this problem without having to create pseudo languages for each potential type of keyboard format error, an embodiment of the present invention uses a small sample of typed text to determine if the appropriate language format is active for the keyboard. FIG. 9A is a diagram illustrating an example of initial sample text typed in an active format of a switchable keyboard in an exemplary embodiment of the present invention.

Referring now to FIG. 9A, the initial sample input 900 is text typed in the active format appears in a Greek alphabet, or more generally a Greek character set. A character set may be any set of symbols, such as an alphabet. The active format of the initial sample input 900 is preferably determined based upon counting the types of characters in the initial sample input 900. If the number of Greek characters in the initial sample input 900 is greater than other types of characters, such as Latin characters, the initial sample input 900 is deemed to be in a Greek character set or alphabet. Thus, the active format of the initial sample input 900 is the Greek alphabet.

In order to determine if the initial sample input 900 is being typed in the proper format of the keyboard 40, the initial sample input 900 is transposed to create an equivalent sample of text in the other relevant language corresponding to an alternative format of the keyboard 40. FIG. 9B is a diagram illustrating an example of transposed sample text in the alternative format of a switchable keyboard in an exemplary embodiment of the present invention.

Referring now to FIGS. 9A and 9B, the transposed text 905 is essentially the equivalent of the initial sample input 900 after having been transposed according to the alternative format of the keyboard 40. In the example illustrated in FIG. 9B, the alternative format of the keyboard 40 uses a Latin alphabet. Thus, the keyboard 40 supports the English language and the Greek language.

The initial sample input 900 and the transposed text 905 are then used to identify their respective languages. Typically, the initial sample input 900 and the transposed text 905 are individually scored. In the exemplary embodiment, the initial sample input 900 is typically scored using only the language profiles related to the active format, such as language profiles using the Greek alphabet. Similarly, the transposed text 905 is typically scored using only the language profiles related to the alternative format, such as language profiles using the Latin alphabet. The highest scoring language for the initial sample input 900 and the highest scoring language for the transposed text 905 are compared to determine the highest overall scoring language between the two versions of text.

Next, if an alphabet or, more generally a character set, associated with this highest overall scoring language is not related to the active format of the keyboard 40, then the active format is deemed improper and the format of the keyboard 40 should be switched. As previously mentioned, switching the format of the keyboard 40 may be accomplished in a variety of ways, such as depressing the selection switch 60 on the keyboard 40, entering a specific sequence of commands or key selections on the keyboard 40, or sending a predetermined control signal to the keyboard 40.

FIG. 10 is a flow diagram illustrating the preferred steps for dynamically handling a keyboard format error in an exemplary embodiment of the present invention. Referring now to FIGS. 1–4, 9A, 9B, and 10, the method 1000 begins at step 1005 where the alphabet, or more generally the character set, of an initial sample input of text is determined to be the active format, such as a format using the Greek alphabet. Typically, the initial sample input is received from the keyboard as it is being entered. In the exemplary embodiment, once the initial sample input is entered, the characters in the initial sample input that are in a first character set, such as Greek letters, are counted. Similarly, the characters in the initial sample input that are in a second character set, such as Latin letters, are counted. If the number of characters counted in the first character set (e.g., Greek letters) is greater than the number of characters counted in the second character set (e.g., Latin letters), then the active format is related to the first character set. For example, in FIG. 9A there are ten Greek characters and there is only one Latin character in the initial sample input 900. Thus, the active format of the keyboard 40 is related to the Greek alphabet.

At step 1010, the letters within the initial sample input are transposed into a transposed input using an alternative format of the keyboard according to another character set, such as a format using Latin characters. For example, the Greek letter alpha from the initial sample input 900 is transposed to the English letter "a" in the transposed text 905 because the same key on the keyboard 40 is pressed to enter both letters, only in different formats.

At step 1015, the initial sample input is processed or scored to identify a first language, preferably using only language profiles associated with the alphabet of the active format. For example, if the initial sample input has an active format of Greek characters, the initial sample input is processed or scored at step 1015 using only those language profiles having the Greek alphabet, e.g., the different length Greek language profiles.

At step 1020, the transposed input is processed or scored to identify a second language, preferably using only language profiles associated with the alphabet of the alternative format. For example, if the transposed input has an alternative format of Latin characters, the transposed input is processed or scored at step 1020 using only those language profiles using the Latin alphabet, e.g., the English language profiles, the French language profiles, the Spanish language profiles, etc. Thus, the processing involved in steps 1015 and 1020 is preferably the method described with respect to FIGS. 5 and 6 for quickly and more accurately identifying the language of a sample of text, such as the transposed sample input or the initial sample input.

Additionally, while the processing involved in steps 1015 and 1020 are described above to be sequentially performed, the present invention contemplates simultaneously processing both of the different text versions. In other words, a window of letters may be slid over the initial sample input at the same time another same length window may be slid over the transposed input. In this manner, both text versions are processed yielding a high scoring language for the initial sample input (the first language) and a high scoring language for the transposed input (the second language).

At step 1025, a highest scoring language is determined between the first language and the second language. This allows either the initial sample input or the transposed input to be identified as the winning language.

At step 1030, the alphabet, or more generally the character set, of the winning language is identified. In the exemplary embodiment, a table is maintained listing languages (such as Greek) and their related character set or alphabet (such as the Greek alphabet). In the example from FIGS. 9A and 9B, those skilled in the art will appreciate that the initial sample input 900 is scored low for most languages because it is essentially greekized English text and there is no language profile for greekized English. However, the transposed text 905 is scored very high for the English language. Thus, the highest scoring language is the English language, which is related to the Latin alphabet. In other words, the Latin alphabet is identified with the winning language.

At step 1035, if the identified alphabet is related to the active format, then there is no keyboard format mixup and the method 1000 terminates after step 1035. However, if the identified alphabet is not related to the active format, then the alternative format is the appropriate format and step 1035 proceeds to step 1040.

At step 1040, a signal is sent to the keyboard 40 to cause the keyboard 40 to switch to the alternative format, such as the Latin alphabet, so that additional text is typed using the Latin alphabet instead of the Greek alphabet. In the exemplary embodiment, the language ID program module 36 notifies the word processing program module 400 that the identified alphabet is not related to the active format of the keyboard 40. As a result, the word processing program module 400 sends the signal to the keyboard 40, typically via conventional messaging within the operating system 35, to switch to the alternative format. Thus, the word processing program module 400 is also able to correctly interpret additional text typed in using the keyboard 40 as well as transpose the previous sample input text according to the appropriate format.

In summary, it is helpful to use such language identification methods based on short input text as described in FIGS. 5 and 6 to help dynamically handle keyboard format errors as described above and illustrated in FIG. 10.

Conclusion

From the foregoing description, it will be appreciated that embodiments of the present invention provide a system and method for using a combination of different length n-gram language profiles to quickly and accurately identify the language of a very small sample input of text from a document. Using a combination of multiple sets of n-gram language profiles for different languages helps to identify shorter sequences (more frequent, but less helpful) and longer sequences (less frequent, but more helpful) common in a particular language. A window for the longest possible sequence is placed over the beginning of the sample text. Basically, the longest sequence of letters found within both the window and the n-gram language profiles is desired. Once a longest match is found within the window, that longest match is scored for each of the languages and the smaller matches within the window are disregarded. This searching and scoring process repeats after the window is shifted from the original position to place another position with a new sequence of letters within the window. In this manner, the combination of multiple length n-gram language profiles is used to quickly and more accurately score the sample text when compared to the tri-gram method.

Based on such a combination technique, additional improvements may be made to enhance the speed and accuracy when using a small amount of sample input text. The additional improvements include restricting the reference letter sequences within longer n-gram language profiles (such as 5-, 6-, and 7-grams) to full and complete words. Another improvement uses a two pass combination n-gram method where the second pass disregards languages that are not scored within 10% of the top language during the first pass. Another improvement favors matched reference letter sequences within n-gram language profiles of complete words during scoring. Another improvement favors longer matched reference letter sequences within n-gram language profiles during scoring. Another accuracy improvement can be made by scoring a match that does not frequently appear in many languages higher than normal to account for the less frequent reference letter sequence's distinctive characteristic. These infrequent reference letter sequences are thus given more weight to help distinguish the correct language, typically by either increasing their score in a proportional manner or normalizing the score with respect to all of the languages.

In addition, a modification of the content of the set of n-gram language profiles can also improve the accuracy of language identification. For a set of n-gram language profiles (e.g., the set of tri-gram language profiles 215 or the set of 4-gram language profiles 300), the reference letter sequences are sorted to determine the highest frequency across the languages for a particular reference letter sequence. If the highest frequency is less than a predetermined threshold, then the entries for the particular reference letter sequence are removed from all of the language profiles. If the particular reference letter sequence passes this test, then a variable threshold is dynamically set and applied on a language-by-language or profile-by-profile basis. The variable threshold is dynamically set according to the value of the predetermined threshold and the value of the particular reference letter sequence's highest frequency.

Furthermore, an embodiment of the present invention also uses methods of identifying the language of a small sample text to handle keyboard language format mixups. An initial sample input 900 of text is processed to determine if the active format of the keyboard is proper. The initial sample input 900 is transposed to create an equivalent sample of text (transposed sample input 905) in the other relevant language corresponding to an alternative format of the keyboard 40. The initial sample input 900 and the transposed sample input 905 are then analyzed to determine their respective languages. One of the sample inputs will be recognized as using one of the languages supported by the keyboard and the keyboard format will be automatically switched to the correct format.

The foregoing system and method may be conveniently implemented in one or more program modules based upon the flow diagrams in FIGS. 5–8 and 10 and their related descriptions. No particular programming language is required for carrying out the various procedures described above because it is considered that the operations, functions, methods, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for using a plurality of n-gram profiles each associated with one of a plurality of languages so as to identify one of the plurality of languages in a sample input, comprising:

(1) placing a window of X length over X letters of the sample input to produce a set of windowed letters;

(2) determining if there is at least one match based upon at least one comparison between any subset of letters ranging from length X to length Y of the windowed letters and a plurality of reference letter sequences ranging from length X to length Y in each of the n-gram profiles for each of the languages;

(3) determining which of the at least one matches is associated with a longest letter sequence in each of the n-gram profiles for each of the languages;

(4) obtaining a score associated with the longest letter sequence in each of the n-gram profiles for each of the languages determined in sub-process (3);

(5) adding each score obtained in sub-process (4) to an associated cumlative score associated with each one of the plurality of languages;

(6) shifting the X-length window within the sample input and repeating sub-processes (2) through (5) until the window has been shifted through the sample input; and (7) identifying the one of the languages based upon which of the languages has a highest cumulative score.

2. The method of claim 1, wherein each of the matches includes a first of the letters within the windowed letters.

3. The method of claim 1, wherein sub-process (4) comprises scoring the longest of the matches only if the longest of the matches is a complete word.

4. The method of claim 1, wherein sub-process (4) comprises scoring the longest of the matches if the longest of the matches is longer than a predetermined threshold and if the longest of the matches is one of a predefined set of words.

5. The method of claim 4, wherein the predefined set of words comprises complete words having at least a predefined frequency of use for one of the languages.

6. The method of claim 1, wherein sub-process (4) comprises scoring the longest of the matches by increasing the score if the longest of the matches is a complete word.

7. The method of claim 1, wherein sub-process (4) comprises scoring the longest of the matches by increasing the score if the longest of the matches has a length greater than a predetermined threshold.

8. The method of claim 7, wherein sub-process (4) comprises scoring the longest of the matches by increasing the score relative to the length of the longest of the matches.

9. The method of claim 1, further comprising, after sub-process (6),
identifying as a close language each language having its associated cumulative score within a predefined percentage of the language having the highest score;
repeating sub-process (1) through (6) while considering only the reference letter sequences in the n-gram profiles associated with each close language; and
wherein sub-process (7) further comprises identifying the one of the languages based upon which close language has the highest score.

10. The method of claim 1 further comprising the sub-process of increasing the cumulative score for one of the languages if a frequency parameter indicates that the longest of the matches is found in less than a predetermined number of the languages.

11. The method of claim 10 further comprising the sub-process of decreasing the cumulative score for the one of the languages if the frequency parameter indicates that the longest of the matches is found in more than a predefined number of the languages.

12. A computer-readable medium on which is stored a computer program for using a plurality of n-gram profiles to identify one of a plurality of languages for a sample input, the computer program comprising instructions, which when executed by a computer, perform the steps of:
(1) placing a window of X length over X letters of the sample input to produce a set of windowed letters;
(2) determining if there is at least one match based upon at least one comparison between any subset of letters ranging from length X to length Y of the windowed letters and a plurality of reference letter sequences ranging from length X to length Y in each of the n-gram profiles for each of the languages;
(3) determining which of the at least one matches is associated with a longest letter sequence in each of the n-gram profiles for each of the languages;
(4) obtaining a score associated with the longest letter sequence in each of the n-gram profiles for each of the languages determined in sub-process (3);
(5) adding each score obtained in sub-process (4) to an associated cumulative score associated with each one of the plurality of languages;
(6) shifting the X-length window within the sample input and repeating sub-processes (2) through (5) until the window has been shifted through the sample input; and
(7) identifying the one of the languages based upon which of the languages has a highest cumulative score.

13. The computer-readable medium of claim 12, wherein sub-process (4) comprises scoring the longest match if the longest match is longer than a predetermined threshold and if the longest match is one of a predefined set of words.

14. The computer-readable medium of claim 13, wherein the predefined set of words comprises complete words having at least a predefined frequency of use for one of the languages.

15. The computer-readable medium of claim 12, wherein sub-process (4) comprises scoring the longest match by increasing the score for one of the languages if the longest match is a complete word in the one of the languages.

16. The computer-readable medium of claim 12, wherein sub-process (4) comprises scoring the longest match by decreasing the score for each of the languages if the longest match is smaller in length than a predetermined threshold.

17. The computer-readable medium of claim 16, wherein sub-process (4) comprises scoring the longest match by increasing the score for each of the languages relative to the length of the longest match.

18. The computer-readable medium of claim 12 further comprising instructions, which when executed by the computer, after sub-process (7) perform:
identifying as close languages each of the languages having its associated cumulative score within a predefined percentage of the language having the highest one of the cumulative scores;
repeating sub-processes (1) through (7) while considering only the reference letter sequences in the n-gram profiles associated with each close language; and
wherein sub-process (7) comprises identifying the one of the languages based upon which close language has the highest one of the cumulative scores.

19. A computer-implemented method for using a plurality of different length n-gram profiles to identify one of a plurality of languages for a sample input, comprising:
(1) placing a window of X length over X letters of the sample input to produce a set of windowed letters;
(2) determining if there is at least one match based upon at least one comparison between any subset of letters ranging from length X to length Y of the windowed letters and a plurality of reference letter sequences ranging from length X to length Y in each of the n-grain profiles for each of the languages;
(3) determining which of the at least one matches is associated with a longest letter sequence in each of the n-gram profiles for each of the languages;
(4) obtaining a score associated with the longest letter sequence in each of the n-gram profiles for each of the languages determined in sub-process (3);
(5) increasing the score obtained if a frequency parameter indicates that the match is found in less than a predetermined number of the languages;
(6) shifting the window over the sample input and repeating steps (2) through (5) until the sample input has been completely shifted through the window; and
(7) identifying the one of the languages based upon which of the languages has the highest of the scores.

20. The method of claim 19, further comprising the sub-process of decreasing the score if the frequency parameter indicates that the that the match is found in greater than a predefined number of the languages.

21. The method of claim 19, wherein the score has a logarithmic relationship to the frequency parameter.

22. The method of claim 19, wherein sub-process (5) comprises normalizing the score relative to the frequency parameter maintained in the n-gram profile for each of the languages when compared to a highest score for the match if the frequency parameter indicates that the match is found in less than the predetermined number of the languages.

23. A computer-implemented method for using a plurality of different length n-gram profiles to identify one of a plurality of languages for a sample input, comprising:

(1) identifying a window of letters within the sample input;

(2) if the window of letters contains a match of the letters within the window when compared to a plurality of reference letter sequences maintained in the n-gram profile for each of the languages, scoring the match as a score for each of the languages based upon a frequency parameter maintained in the n-gram profile for each of the languages, the frequency parameter being related to the match;

(3) normalizing the score across the languages;

(4) increasing the normalized score based upon the value of a logarithm of the score;

(5) adding the normalized score to a cumulative score for each of the languages;

(6) shifting the window over the sample input and repeating sub-processes (2) and (5) until the sample input has been completely shifted through the window; and (7) identifying the one of the languages based upon which of the languages has the highest of the scores.

24. The method of claim 23, wherein step (3) comprises normalizing the score based upon the frequency of the match in each of the n-gram profiles for each of the languages.

* * * * *